United States Patent
Sengupta et al.

(10) Patent No.: US 11,476,982 B2
(45) Date of Patent: Oct. 18, 2022

(54) MULTIPLEXING MULTICAST AND UNICAST FEEDBACK

(71) Applicant: QUALCOMM incorporated, San Diego, CA (US)

(72) Inventors: Ayan Sengupta, San Diego, CA (US); Kazuki Takeda, Tokyo (JP); Alberto Rico Alvarino, San Diego, CA (US); Le Liu, Fremont, CA (US); Peter Gaal, San Diego, CA (US); Wanshi Chen, San Diego, CA (US); Tao Luo, San Diego, CA (US); Juan Montojo, San Diego, CA (US); Xiaoxia Zhang, San Diego, CA (US); Mostafa Khoshnevisan, San Diego, CA (US); Prasad Reddy Kadiri, San Diego, CA (US); Umesh Phuyal, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/326,752

(22) Filed: May 21, 2021

(65) Prior Publication Data

US 2021/0376966 A1 Dec. 2, 2021

Related U.S. Application Data

(60) Provisional application No. 63/030,851, filed on May 27, 2020.

(51) Int. Cl.
*H04L 1/18* (2006.01)
*H04L 27/26* (2006.01)
(Continued)

(52) U.S. Cl.
CPC .......... *H04L 1/1896* (2013.01); *H04L 1/1664* (2013.01); *H04L 27/2607* (2013.01); *H04W 4/06* (2013.01)

(58) Field of Classification Search
CPC ... H04L 1/1664; H04L 1/1671; H04L 1/1829; H04L 1/1854; H04L 1/1896;
(Continued)

(56) References Cited

U.S. PATENT DOCUMENTS 11,405,812 B2 * 8/2022 Xu ........................ H04W 4/023
2014/0020031 A1 * 1/2014 Barrett ................ H04W 72/005
725/62

(Continued)

FOREIGN PATENT DOCUMENTS

EP 3319256 A1 5/2018
WO WO-2017171616 A1 10/2017

OTHER PUBLICATIONS

International Search Report and Written Opinion—PCT/US2021/033822—ISA/EPO—dated Sep. 22, 2021.

*Primary Examiner* — Dung B Huynh
(74) *Attorney, Agent, or Firm* — Holland & Hart LLP

(57) ABSTRACT

Methods, systems, and devices for wireless communications are described that support multiplexing multicast and unicast feedback. A base station may provision different subsets of resources from a set of resources for multicast feedback message transmission based on channel metric(s) of a user equipment (UE). The set of resources may include a plurality of subsets of resources, with each subset of resources being associated with a corresponding channel metric or range of channel metrics associated with each UE receiving the multicast transmission. A UE may determine that a feedback indication is to be provided in response to the multicast transmission, and select a subset of resources from the plurality of subsets of resources based on its own channel (Continued)

metric. The UE may multiplex the multicast feedback, an indication of the selected subset, and unicast feedback in a multiplexed feedback transmission to the base station.

30 Claims, 17 Drawing Sheets

(51) Int. Cl.
*H04L 1/16* (2006.01)
*H04W 4/06* (2009.01)

(58) Field of Classification Search
CPC ....... H04L 2001/0093; H04L 27/26025; H04L 27/2607; H04W 4/06
See application file for complete search history.

(56) References Cited

U.S. PATENT DOCUMENTS

| | | | |
|---|---|---|---|
| 2014/0256328 A1* | 9/2014 | Li | H04W 36/0058 455/444 |
| 2014/0286246 A1* | 9/2014 | Bao | H04L 5/0037 370/329 |
| 2017/0079010 A1* | 3/2017 | Zhang | H04L 47/15 |
| 2018/0076935 A1* | 3/2018 | Seo | H04L 1/00 |
| 2018/0152274 A1* | 5/2018 | Li | H04L 5/0055 |
| 2018/0254872 A1* | 9/2018 | Seo | H04L 5/0055 |
| 2018/0278314 A1* | 9/2018 | Nam | H04B 7/0413 |
| 2019/0052398 A1* | 2/2019 | Prasad | H04L 1/0026 |
| 2019/0132104 A1* | 5/2019 | Lee | H04L 1/1664 |
| 2020/0107319 A1* | 4/2020 | Bagheri | H04L 1/1825 |
| 2020/0154404 A1* | 5/2020 | Göktepe | H04L 1/1664 |
| 2020/0351933 A1* | 11/2020 | Nam | H04B 7/0695 |
| 2021/0136693 A1* | 5/2021 | Zhang | H04W 76/40 |
| 2021/0307052 A1* | 9/2021 | Zhou | H04W 72/085 |
| 2021/0345313 A1* | 11/2021 | Basu Mallick | H04L 5/0057 |
| 2021/0376966 A1* | 12/2021 | Sengupta | H04L 1/1829 |
| 2021/0377912 A1* | 12/2021 | El Hamss | H04L 1/1819 |
| 2021/0391967 A1* | 12/2021 | Gao | H04L 5/0035 |
| 2022/0007335 A1* | 1/2022 | Feng | H04L 5/0055 |
| 2022/0060290 A1* | 2/2022 | Wu | H04L 1/1896 |
| 2022/0061076 A1* | 2/2022 | Ma | H04L 5/0055 |
| 2022/0061078 A1* | 2/2022 | Guan | H04W 72/0466 |
| 2022/0166489 A1* | 5/2022 | Takano | H04W 16/28 |
| 2022/0191833 A1* | 6/2022 | Qu | H04L 1/1854 |
| 2022/0200742 A1* | 6/2022 | Li | H04L 1/18 |
| 2022/0232609 A1* | 7/2022 | Lee | H04W 72/1242 |
| 2022/0232610 A1* | 7/2022 | Lee | H04W 72/1289 |

* cited by examiner

MULTIPLEXING MULTICAST AND UNICAST FEEDBACK

CROSS REFERENCE

The present application for patent claims the benefit of U.S. Provisional Patent Application No. 63/030,851 by SENGUPTA et al., entitled "MULTIPLEXING MULTICAST AND UNICAST FEEDBACK," filed May 27, 2020, assigned to the assignee hereof, and expressly incorporated by reference herein.

FIELD OF TECHNOLOGY

The following relates generally to wireless communications and more specifically to multiplexing multicast and unicast feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support multicast communications, in which a base station may transmit communications to multiple UEs, which may be in addition to unicast communications between the base station and one or more individual UEs. One or more of the UEs that receive the multicast communications may provide feedback that indicates successful or unsuccessful reception of the multicast communications. In some cases, UEs that successfully receive multicast communications may refrain from providing feedback, and UEs that do not successfully receive the multicast communications may provide feedback that provides a negative acknowledgment (NACK), and thus the base station may identify UEs that did not receive the communication. In some cases, the base station may take further action based on the feedback from the multicast communications, such as modifying one or more transmission parameters, retransmitting data, or combinations thereof. Techniques to enhance system performance for multicast communications and associated feedback may be desirable in order to enhance network efficiency and reliability.

SUMMARY

The described techniques relate to improved methods, systems, devices, and apparatuses that support multiplexing multicast and unicast feedback. Aspects of the described techniques provide for provisioning different subsets of resources from a set of resources for user equipment (UEs) to use for multicast feedback message transmission based on channel metric(s) of the UE. For example, the base station may configure UEs associated with a multicast transmission with the set of resources (e.g., time/frequency/sequence/spatial resources) for the UE to use for transmitting an indication of multicast feedback. The set of resources may include a plurality of subsets of resources, with each subset of resources being associated with a corresponding channel metric (or a range of channel metrics) associated with each UE receiving the multicast transmission.

Each UE may determine that a feedback indication is to be provided in response to one or more multicast communications, and then select a first subset of resources from the plurality of subsets of resources based on its own channel metric. Thus, the selected subset of resources used to provide the multicast feedback may allow the base station to identify the channel metric associated with the UE. Further, in some cases unicast feedback may be present at the UE for transmission to the base station, and an uplink transmission occasion for the unicast feedback may overlap with an uplink transmission occasion for the multicast feedback. In such cases, the UE may multiplex the unicast feedback and multicast feedback and transmit the multiplexed feedback to the base station. In some cases, the multiplexed feedback may provide an indication of the channel metric at the UE, an indication of the unicast feedback, and an indication of the multicast feedback.

A method of wireless communication at a UE is described. The method may include determining, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric, determining that both the multicast feedback indication and a unicast feedback indication are to be provided in a first uplink transmission occasion, where the unicast feedback indication is associated with one or more unicast communications to the UE, multiplexing the unicast feedback indication, the multicast feedback indication, and an indication of the first subset of multicast feedback resources into a multiplexed feedback message for transmission in the first uplink transmission occasion, and transmitting the multiplexed feedback message in the first uplink transmission occasion.

An apparatus for wireless communication at a UE is described. The apparatus may include a processor, memory coupled with the processor, and instructions stored in the memory. The instructions may be executable by the processor to cause the apparatus to determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric, determine that both the multicast feedback indication and a unicast feedback indication are to be provided in a first uplink transmission occasion, where the unicast feedback indication is associated with one or more unicast communications to the UE, multiplex the unicast feedback indication, the multicast feedback indication, and an indication of the first subset of multicast feedback resources into a multiplexed feedback message for transmission in the first uplink transmission occasion, and transmit the multiplexed feedback message in the first uplink transmission occasion.

Another apparatus for wireless communication at a UE is described. The apparatus may include means for determining, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric, determining that both the multicast feedback indication and a unicast feedback indication are to be provided in a first uplink transmission occasion, where the unicast feedback indication is associated with one or more unicast communications to the UE, multiplexing the unicast feedback indication, the multicast feedback indication, and an indication of the first subset of multicast feedback resources into a multiplexed feedback message for transmission in the first uplink transmission occasion, and transmitting the multiplexed feedback message in the first uplink transmission occasion.

A non-transitory computer-readable medium storing code for wireless communication at a UE is described. The code may include instructions executable by a processor to determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric, determine that both the multicast feedback indication and a unicast feedback indication are to be provided in a first uplink transmission occasion, where the unicast feedback indication is associated with one or more unicast communications to the UE, multiplex the unicast feedback indication, the multicast feedback indication, and an indication of the first subset of multicast feedback resources into a multiplexed feedback message for transmission in the first uplink transmission occasion, and transmit the multiplexed feedback message in the first uplink transmission occasion.

In some examples of the method, apparatuses, and non-transitory computer-readable medium described herein, the multicast feedback indication includes a subset identification corresponding to the first subset of multicast feedback resources. In some examples of the method, apparatuses, and non-transitory computer-readable medium described herein, the multiplexed feedback message includes a first subset of bits associated with the unicast feedback indication and a second subset of bits associated with the multicast feedback indication and the subset identification. In some examples of the method, apparatuses, and non-transitory computer-readable medium described herein, the second subset of bits indicate a number of states associated with a number of the set of subsets of multicast feedback resources and a state that indicates whether at least one of the one or more multicast communications was successfully received.

In some examples of the method, apparatuses, and non-transitory computer-readable medium described herein, the multiplexed feedback message further includes a third subset of bits that indicates a beam used at the UE for receiving the one or more multicast communications.

In some examples of the method, apparatuses, and non-transitory computer-readable medium described herein, the multicast feedback indication provides feedback for multiple multicast transport blocks (TBs) of the one or more multicast communications. and where the channel metric associated with the first subset of multicast feedback resources applies to each of the multiple multicast TBs.

In some examples of the method, apparatuses, and non-transitory computer-readable medium described herein, the multicast feedback indication includes a first bitstream that indicates the first subset of multicast feedback resources and a second bitstream that indicates an acknowledgment or negative acknowledgment for each of the one or more multicast communications.

In some examples of the method, apparatuses, and non-transitory computer-readable medium described herein, the transmitting the multiplexed feedback may include operations, features, means, or instructions for transmitting, in the first uplink transmission occasion, two or more concurrent multiplexed feedback messages for each of two or more multicast communications, each of the two or more concurrent multiplexed feedback messages providing an associated multicast feedback indication and an associated subset of multicast feedback resources. In some examples of the method, apparatuses, and non-transitory computer-readable medium described herein, the multiplexed feedback message includes a first subset of bits associated with the unicast feedback indication and a second subset of bits associated with the multicast feedback indication, and where the second subset of bits indicates whether the one or more multicast communications were successfully received and includes one or more additional bits that indicate a subset identification associated with the first subset of the set of subsets of multicast feedback resources. In some examples of the method, apparatuses, and non-transitory computer-readable medium described herein, the one or more additional bits are reserved or reused when acknowledgment feedback is provided for each of the one or more multicast communications. In some examples of the method, apparatuses, and non-transitory computer-readable medium described herein, the one or more additional bits are reused to provide unicast uplink control information.

In some examples of the method, apparatuses, and non-transitory computer-readable medium described herein, the multiplexed feedback message includes a bitmap that indicates which subset of the set of subsets of multicast feedback resources selected at the first subset at the UE. Some examples of the method, apparatuses, and non-transitory computer-readable medium described herein may further include operations, features, means, or instructions for determining an available payload size of the multiplexed feedback message based on resources of the first uplink transmission occasion, and determining a number of bits to include in the multicast feedback indication, the unicast feedback indication, or combinations thereof.

In some examples of the method, apparatuses, and non-transitory computer-readable medium described herein, the determining the number of bits may include operations, features, means, or instructions for determining to include only acknowledgment or negative-acknowledgment feedback in the multicast feedback indication, and only acknowledgment or negative-acknowledgment feedback in the unicast feedback indication, when the available payload size is less than a first threshold value, determining to include acknowledgment or negative-acknowledgment feedback in the multicast feedback indication and the unicast feedback indication, and a unicast channel metric, when the available payload size is between the first threshold value and a second threshold value, and determining to include acknowledgment or negative-acknowledgment feedback and the indication of the first subset of multicast feedback resources in the multicast feedback indication, and to include acknowledgment or negative-acknowledgment feedback and the unicast channel metric in the unicast feedback indication, when the available payload size is at or above the second threshold value.

In some examples of the method, apparatuses, and non-transitory computer-readable medium described herein, the number of bits to include in the multicast feedback indication is further based on a number of multicast transport blocks that have feedback to be reported.

Some examples of the method, apparatuses, and non-transitory computer-readable medium described herein may further include operations, features, means, or instructions for determining whether to transmit an explicit value of the channel metric associated with the one or more multicast communications, or the indication of the first subset of multicast feedback resources, with the multiplexed feedback message. In some examples of the method, apparatuses, and non-transitory computer-readable medium described herein, the determining whether to transmit the explicit value of the channel metric is based on an available payload size for the multiplexed feedback message in the first uplink transmission occasion. In some examples of the method, apparatuses, and non-transitory computer-readable medium described herein, the indication of the first subset of multicast feedback resources is provided based on an uplink control channel resource identification used to transmit the multiplexed feedback message.

In some examples of the method, apparatuses, and non-transitory computer-readable medium described herein, a set of uplink control channel resource identifications have a joint initialization of associated parameters that is mapped to different unicast or multicast feedback parameters. In some examples of the method, apparatuses, and non-transitory computer-readable medium described herein, the joint initialization includes a different cyclic shift that is applied for different subsets of multicast feedback resources. In some examples of the method, apparatuses, and non-transitory computer-readable medium described herein, the multiplexed feedback message indicates an acknowledgment of receipt of the one or more multicast communications and the indication of the first subset of multicast feedback resources to provide an indication of channel metrics associated with the one or more multicast communications.

In some examples of the method, apparatuses, and non-transitory computer-readable medium described herein, the multiplexed feedback message includes one or more bits that indicate the channel metric for the multicast feedback indication in a subset of multiple multiplexed feedback message communications, and where one or more other multiplexed feedback message communications indicate only an acknowledgment or negative-acknowledgment of the corresponding multicast communication. In some examples of the method, apparatuses, and non-transitory computer-readable medium described herein, the subset of multiple multiplexed feedback message communications is determined based at least in part of a higher layer parameter.

In some examples of the method, apparatuses, and non-transitory computer-readable medium described herein multiple multiplexed feedback message communications are transmitted corresponding to multiple multicast communications, and where different portions of channel metric information associated with the multicast communications are transmitted in different multiplexed feedback messages, and where the channel metric information associated with the multicast communications is assumed to be identical across the multiple multiplexed feedback message communications.

Some examples of the method, apparatuses, and non-transitory computer-readable medium described herein may further include operations, features, means, or instructions for determining that the one or more multicast communications have an associated channel metric that can be inferred from channel state information associated with the one or more unicast communications, and transmitting only channel metric information associated with the one or more unicast communications in the multiplexed feedback message.

Some examples of the method, apparatuses, and non-transitory computer-readable medium described herein may further include operations, features, means, or instructions for determining one or more portions of unicast feedback, multicast feedback, or combinations thereof, that is to be included with the multiplexed feedback message based on one or more prioritization or dropping rules.

In some examples of the method, apparatuses, and non-transitory computer-readable medium described herein positive or negative acknowledgement feedback indications of the multicast communication(s) have priority over multicast channel metric feedback and unicast channel metric feedback, a first component of multicast channel metric feedback has priority over one or more other components of multicast channel metric feedback, a first component of channel state information feedback associated with the unicast feedback indication has priority over all or a portion of multicast feedback indications; or any combinations thereof.

In some examples of the method, apparatuses, and non-transitory computer-readable medium described herein, the transmitting may include operations, features, means, or instructions for transmitting separate concurrent transmissions that indicate the multicast feedback indication and the unicast feedback indication. In some examples of the method, apparatuses, and non-transitory computer-readable medium described herein, the separate concurrent transmissions are transmitted via separate beams, via different resource blocks, or any combinations thereof. In some examples of the method, apparatuses, and non-transitory computer-readable medium described herein, the separate concurrent transmissions are enabled based on a capability of the UE.

Some examples of the method, apparatuses, and non-transitory computer-readable medium described herein may further include operations, features, means, or instructions for determining to drop one or more multicast feedback indications from the multiplexed feedback message based on a timeline between the multicast communication and the first uplink control channel occasion. In some examples of the method, apparatuses, and non-transitory computer-readable medium described herein, the uplink transmission occasion is an uplink control channel occasion or an uplink shared channel occasion in which control information is piggybacked with shared channel data. In some examples of the method, apparatuses, and non-transitory computer-readable medium described herein, the multiplexed feedback message includes a first subset of bits associated with acknowledgment or negative-acknowledgment indications for the one or more multicast communications, and a second subset of bits associated with the channel metric of the UE, and where the first subset of bits are mapped to be closer to a reference signal of the first uplink transmission occasion than the second subset of bits.

Some examples of the method, apparatuses, and non-transitory computer-readable medium described herein may further include operations, features, means, or instructions for receiving DCI that provides an indication of uplink resources for the first uplink transmission occasion, where the DCI indicates that the multiplexed feedback message is to be transmitted in the first uplink transmission occasion. In some examples of the method, apparatuses, and non-transitory computer-readable medium described herein, the UE transmits the multiplexed feedback message responsive to the DCI irrespective of whether the UE received multicast scheduling information associated with the one or more multicast communications.

Some examples of the method, apparatuses, and non-transitory computer-readable medium described herein may further include operations, features, means, or instructions for receiving DCI that provides an indication that the multicast feedback indication is to be piggybacked with shared channel data in an uplink shared channel communication. In some examples of the method, apparatuses, and non-transitory computer-readable medium described herein, the piggybacked multicast feedback indication is punctured onto the shared channel data in the uplink shared channel communication. In some examples of the method, apparatuses, and non-transitory computer-readable medium described herein, the DCI further indicates reserved resources within the uplink shared channel communication that are to be used for the piggybacked multicast feedback indication.

A method of wireless communication at a base station is described. The method may include configuring a first UE with a set of subsets of multicast feedback resources to use for providing a multicast feedback indication associated with one or more multicast communications, where each subset of the set of subsets of multicast feedback resources is associated with a different corresponding channel metric, allocating, to the first UE, uplink resources in at least a first uplink transmission occasion for communication of feedback information from the first UE, transmitting a multicast communication to a set of UEs including the first UE, transmitting a unicast communication to the first UE, where both the multicast feedback indication and a unicast feedback indication are to be provided in the first uplink transmission occasion, and receiving, from the first UE in the first uplink transmission occasion, a multiplexed feedback message that multiplexes the unicast feedback indication, the multicast feedback indication, and an indication of a first subset of multicast feedback resources associated with a first channel metric at the first UE.

An apparatus for wireless communication at a base station is described. The apparatus may include a processor, memory coupled with the processor, and instructions stored in the memory. The instructions may be executable by the processor to cause the apparatus to configure a first UE with a set of subsets of multicast feedback resources to use for providing a multicast feedback indication associated with one or more multicast communications, where each subset of the set of subsets of multicast feedback resources is associated with a different corresponding channel metric, allocate, to the first UE, uplink resources in at least a first uplink transmission occasion for communication of feedback information from the first UE, transmit a multicast communication to a set of UEs including the first UE, transmit a unicast communication to the first UE, where both the multicast feedback indication and a unicast feedback indication are to be provided in the first uplink transmission occasion, and receive, from the first UE in the first uplink transmission occasion, a multiplexed feedback message that multiplexes the unicast feedback indication, the multicast feedback indication, and an indication of a first subset of multicast feedback resources associated with a first channel metric at the first UE.

Another apparatus for wireless communication at a base station is described. The apparatus may include means for configuring a first UE with a set of subsets of multicast feedback resources to use for providing a multicast feedback indication associated with one or more multicast communications, where each subset of the set of subsets of multicast feedback resources is associated with a different corresponding channel metric, allocating, to the first UE, uplink resources in at least a first uplink transmission occasion for communication of feedback information from the first UE, transmitting a multicast communication to a set of UEs including the first UE, transmitting a unicast communication to the first UE, where both the multicast feedback indication and a unicast feedback indication are to be provided in the first uplink transmission occasion, and receiving, from the first UE in the first uplink transmission occasion, a multiplexed feedback message that multiplexes the unicast feedback indication, the multicast feedback indication, and an indication of a first subset of multicast feedback resources associated with a first channel metric at the first UE.

A non-transitory computer-readable medium storing code for wireless communication at a base station is described. The code may include instructions executable by a processor to configure a first UE with a set of subsets of multicast feedback resources to use for providing a multicast feedback indication associated with one or more multicast communications, where each subset of the set of subsets of multicast feedback resources is associated with a different corresponding channel metric, allocate, to the first UE, uplink resources in at least a first uplink transmission occasion for communication of feedback information from the first UE, transmit a multicast communication to a set of UEs including the first UE, transmit a unicast communication to the first UE, where both the multicast feedback indication and a unicast feedback indication are to be provided in the first uplink transmission occasion, and receive, from the first UE in the first uplink transmission occasion, a multiplexed feedback message that multiplexes the unicast feedback indication, the multicast feedback indication, and an indication of a first subset of multicast feedback resources associated with a first channel metric at the first UE.

In some examples of the method, apparatuses, and non-transitory computer-readable medium described herein, the multicast feedback indication includes a subset identification corresponding to the first subset of multicast feedback resources. In some examples of the method, apparatuses, and non-transitory computer-readable medium described herein, the multiplexed feedback message includes a first subset of bits associated with the unicast feedback indication and a second subset of bits associated with the multicast feedback indication and the subset identification. In some examples of the method, apparatuses, and non-transitory computer-readable medium described herein, the second subset of bits indicate a number of states associated with a number of the set of subsets of multicast feedback resources and a state that indicates whether at least one of the one or more multicast communications was successfully received. In some examples of the method, apparatuses, and non-transitory computer-readable medium described herein, the multiplexed feedback message further includes a third subset of bits that indicates a beam used at the UE for receiving the one or more multicast communications.

In some examples of the method, apparatuses, and non-transitory computer-readable medium described herein, the multicast feedback indication provides feedback for multiple multicast transport blocks (TBs) of the one or more multicast communications. and where the channel metric associated with the first subset of multicast feedback resources applies to each of the multiple multicast TBs. In some examples of the method, apparatuses, and non-transitory computer-readable medium described herein, the multicast feedback indication includes a first bitstream that indicates the first subset of multicast feedback resources and a second bitstream that indicates an acknowledgment or negative acknowledgment for each of the one or more multicast communications. In some examples of the method, apparatuses, and non-transitory computer-readable medium described herein, the receiving the multiplexed feedback may include operations, features, means, or instructions for receiving, in the first uplink transmission occasion, two or more concurrent multiplexed feedback messages for each of two or more multicast communications, each of the two or more concurrent multiplexed feedback messages providing an associated multicast feedback indication and an associated subset of multicast feedback resources.

In some examples of the method, apparatuses, and non-transitory computer-readable medium described herein, the multiplexed feedback message includes a first subset of bits associated with the unicast feedback indication and a second subset of bits associated with the multicast feedback indication, and where the second subset of bits indicates whether the one or more multicast communications were successfully received and includes one or more additional bits that indicate a subset identification associated with the first subset of the set of subsets of multicast feedback resources. In some examples of the method, apparatuses, and non-transitory computer-readable medium described herein, the one or more additional bits are reserved or reused when acknowledgment feedback is provided for each of the one or more multicast communications. In some examples of the method, apparatuses, and non-transitory computer-readable medium described herein, the one or more additional bits are reused to provide unicast uplink control information.

In some examples of the method, apparatuses, and non-transitory computer-readable medium described herein, the multiplexed feedback message includes a bitmap that indicates which subset of the set of subsets of multicast feedback resources selected at the first subset at the UE. In some examples of the method, apparatuses, and non-transitory computer-readable medium described herein, the multiplexed feedback message includes a payload that is determined based on resources of the first uplink transmission occasion.

In some examples of the method, apparatuses, and non-transitory computer-readable medium described herein, the multiplexed feedback message includes only acknowledgment or negative-acknowledgment feedback in the multicast feedback indication, and only acknowledgment or negative-acknowledgment feedback in the unicast feedback indication, when an available payload size is less than a first threshold value, the multiplexed feedback message includes acknowledgment or negative-acknowledgment feedback in the multicast feedback indication, and the unicast feedback indication and a unicast channel metric in the unicast feedback indication, when the available payload size is between the first threshold value and a second threshold value, and the multiplexed feedback message includes acknowledgment or negative-acknowledgment feedback and the indication of the first subset of multicast feedback resources in the multicast feedback indication, and acknowledgment or negative-acknowledgment feedback and the unicast channel metric in the unicast feedback indication, when the available payload size is at or above the second threshold value.

In some examples of the method, apparatuses, and non-transitory computer-readable medium described herein, the number of bits in the multicast feedback indication is further based on a number of multicast transport blocks that have feedback to be reported. In some examples of the method, apparatuses, and non-transitory computer-readable medium described herein, the multiplexed feedback message includes an explicit value of the channel metric associated with the one or more multicast communications, or the indication of the first subset of multicast feedback resources. In some examples of the method, apparatuses, and non-transitory computer-readable medium described herein, the explicit value of the channel metric associated with the multicast communication or the indication of the first subset of multicast feedback resources is indicated based on an available payload size for the multiplexed feedback message in the first uplink transmission occasion. In some examples of the method, apparatuses, and non-transitory computer-readable medium described herein, the indication of the first subset of multicast feedback resources is provided based on an uplink control channel resource identification used to transmit the multiplexed feedback message.

In some examples of the method, apparatuses, and non-transitory computer-readable medium described herein, a set of uplink control channel resource identifications has a joint initialization of associated parameters that are mapped to different unicast or multicast feedback parameters. In some examples of the method, apparatuses, and non-transitory computer-readable medium described herein, the joint initialization includes a different cyclic shift that is applied for different subsets of multicast feedback resources.

In some examples of the method, apparatuses, and non-transitory computer-readable medium described herein, the multiplexed feedback message indicates an acknowledgment of receipt of the one or more multicast communications and the indication of the first subset of multicast feedback resources to provide an indication of channel metrics associated with the one or more multicast communications. In some examples of the method, apparatuses, and non-transitory computer-readable medium described herein, the multiplexed feedback message includes one or more bits that indicate the channel metric for the multicast feedback indication in a subset of multiple multiplexed feedback message communications, and where one or more other multiplexed feedback message communications indicate only an acknowledgment or negative-acknowledgment of the corresponding multicast communication. In some examples of the method, apparatuses, and non-transitory computer-readable medium described herein, the subset of multiple multiplexed feedback message communications is provided by a higher layer parameter.

In some examples of the method, apparatuses, and non-transitory computer-readable medium described herein multiple multiplexed feedback message communications is transmitted corresponding to multiple multicast communications, and where different portions of channel metric information associated with the multicast communications are transmitted in different multiplexed feedback messages, and where the channel metric information associated with the multicast communications is assumed to be identical across the multiple multiplexed feedback message communications. In some examples of the method, apparatuses, and non-transitory computer-readable medium described herein channel metric information associated with the one or more multicast communications is inferred from channel metric information associated with the one or more unicast communications when the multicast feedback indication does not provide channel metric information. In some examples of the method, apparatuses, and non-transitory computer-readable medium described herein, one or more portions of unicast feedback, multicast feedback, or combinations thereof, that are to be included with the multiplexed feedback message are determined based on one or more prioritization or dropping rules.

In some examples of the method, apparatuses, and non-transitory computer-readable medium described herein may positive or negative acknowledgement feedback indications of the multicast communication(s) have priority over multicast channel metric feedback and unicast channel metric feedback, a first component of multicast channel metric feedback has priority over one or more other components of multicast channel metric feedback, a first component of channel state information feedback associated with the unicast feedback indication has priority over all or a portion of multicast feedback indications; or any combinations thereof.

Some examples of the method, apparatuses, and non-transitory computer-readable medium described herein may further include operations, features, means, or instructions for separating concurrent transmissions that indicate the multicast feedback indication and the unicast feedback indication is transmitted by the first UE. In some examples of the method, apparatuses, and non-transitory computer-readable medium described herein, the separate concurrent transmissions are transmitted via separate beams, via different resource blocks, or any combinations thereof. In some examples of the method, apparatuses, and non-transitory computer-readable medium described herein, the separate concurrent transmissions are enabled based on a capability of the UE.

In some examples of the method, apparatuses, and non-transitory computer-readable medium described herein, the UE determines to drop one or more multicast feedback indications from the multiplexed feedback message based on a timeline between the multicast communication and the first uplink control channel occasion. In some examples of the method, apparatuses, and non-transitory computer-readable medium described herein, the uplink transmission occasion is an uplink control channel occasion or an uplink shared channel occasion in which control information is piggybacked with shared channel data.

In some examples of the method, apparatuses, and non-transitory computer-readable medium described herein, the multiplexed feedback message includes a first subset of bits associated with acknowledgment or negative-acknowledgment indications for the one or more multicast communications, and a second subset of bits associated with the channel metric of the UE, and where the first subset of bits is mapped to be closer to a reference signal of the first uplink transmission occasion than the second subset of bits.

Some examples of the method, apparatuses, and non-transitory computer-readable medium described herein may further include operations, features, means, or instructions for transmitting DCI that provides an indication of uplink resources for the first uplink transmission occasion, where the DCI indicates that the multiplexed feedback message is to be transmitted in the first uplink transmission occasion. In some examples of the method, apparatuses, and non-transitory computer-readable medium described herein, the UE transmits the multiplexed feedback message responsive to the DCI irrespective of whether the UE received multicast scheduling information associated with the one or more multicast communications.

Some examples of the method, apparatuses, and non-transitory computer-readable medium described herein may further include operations, features, means, or instructions for transmitting DCI that provides an indication that the multicast feedback indication is to be piggybacked with shared channel data in an uplink shared channel communication. In some examples of the method, apparatuses, and non-transitory computer-readable medium described herein, the piggybacked multicast feedback indication is punctured onto the shared channel data in the uplink shared channel communication. In some examples of the method, apparatuses, and non-transitory computer-readable medium described herein, the DCI further indicates reserved resources within the uplink shared channel communication that are to be used for the piggybacked multicast feedback indication.

DETAILED DESCRIPTION

Figure 1:
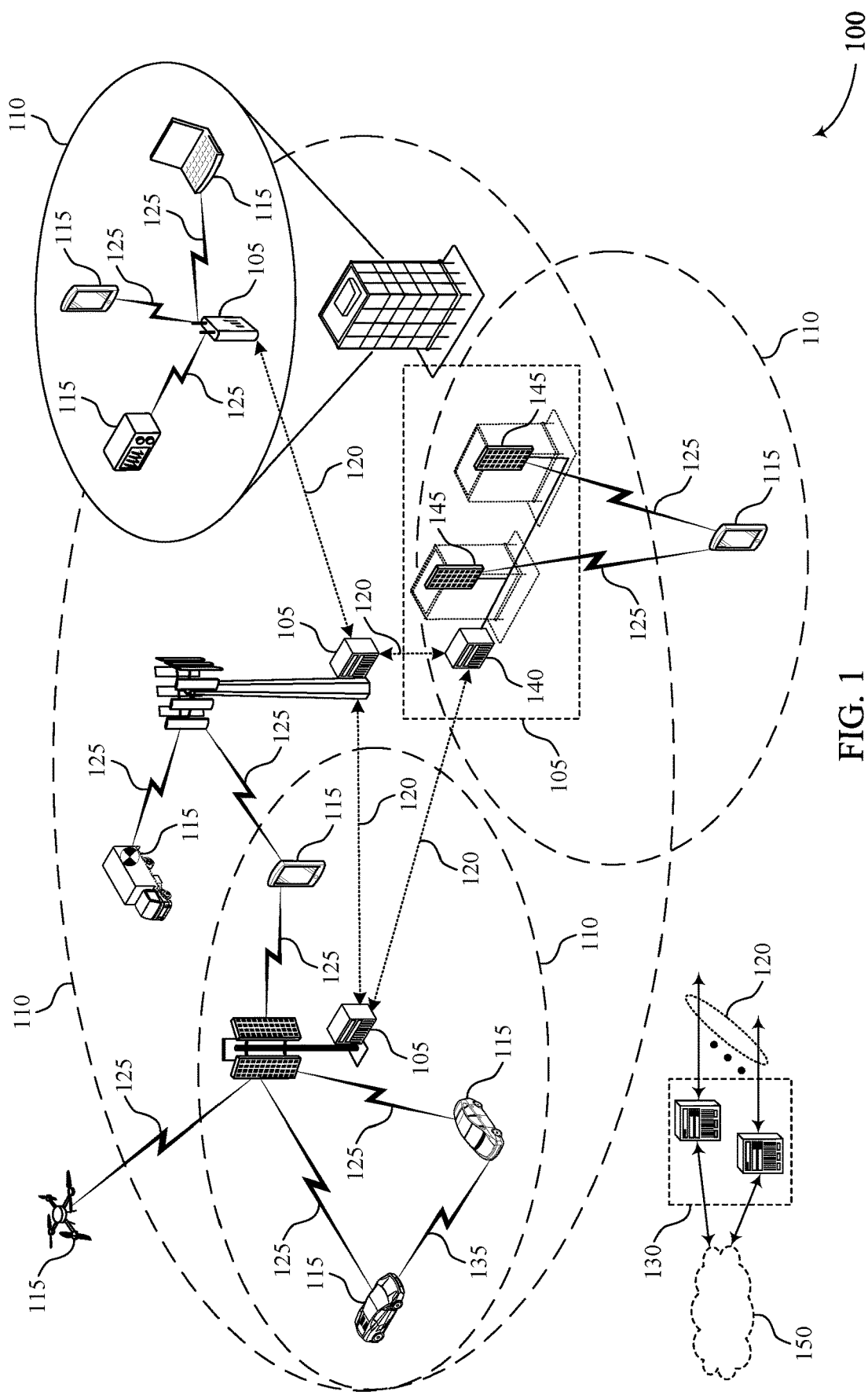
FIG. 1 illustrates an example of a system for wireless communications that supports multiplexing multicast and unicast feedback in accordance with aspects of the present disclosure.

Wireless communications systems may support unicast communications and multicast communications. Unicast communications describe transmissions between a base station and a specific user equipment (UE). Multicast communications (which may also be referred to as broadcast or groupcast communications) describe transmissions between a base station and a number of UEs, and as used herein multicast communications may refer to any one-to-many communications in which a transmitting device (e.g., a base station or UE) transmits a communication for receipt at two or more receiving devices. UEs may be configured to convey a feedback indication (e.g., hybrid automatic repeat request (HARQ) acknowledgment/negative-acknowledgment (ACK/NACK) feedback) in response to receiving a transmission from a base station. In the unicast communication example, the resources used to convey the feedback indication in the feedback message may be scheduled or otherwise identified when scheduling the downlink transmission to the UE. Resources for transmitting the feedback indication in response to a multicast transmission, in some cases, are configured in a common resource pool, with the UE accessing the common resource pool to transmit a feedback message conveying its feedback indication for the multicast transmission.

In some cases, the resources in the common resource pool may be partitioned such that different UEs may use different partitioned resources for the multicast feedback. For example, different subsets of resources of the common resource pool may be associated with different channel metrics associated with the multicast communication as measured at the UE. The channel metric in this context may be geographically based (e.g., angle-of-arrival/angle-of-departure information, transmit/receive beam, location within a cell, a location relative to a base station, etc.), performance-based (e.g., reference signal received power (RSRP), interference level, throughput level, etc.), or any combination thereof. Thus, the indication of the feedback from the UE and the resource used to provide the feedback may provide both feedback and channel metric information to the base station. However, in some cases the common resource pool may be located in a same uplink transmission opportunity as resources for transmitting unicast feedback (e.g., a physical uplink control channel (PUCCH) opportunity or a physical uplink shared channel (PUSCH) opportunity that carries uplink control information (UCI) that is piggybacked with PUSCH data). In accordance with various aspects of the present disclosure, multicast feedback and unicast feedback may be multiplexed and transmitted in the same uplink transmission opportunity (e.g., using the unicast feedback resources).

In some cases, the multiplexed feedback may include one or more information fields or sets of bits that are used to indicate the unicast feedback, the multicast feedback, and the channel metric information. The channel metric information associated with the multicast feedback may be provided, in some cases, by an explicit indication of one or more channel metric values, by an indication of the subset of multicast feedback resources that would otherwise have been used to transmit the multicast feedback, or combinations thereof. For example, in some cases the different subsets of the common resource pool for multicast feedback may have an associated subset ID, and the subset ID may be provided with the multiplexed feedback and used to indicate the channel metric. In other cases, a bitmap may be provided with the multiplexed feedback, with each position in the bitmap mapped to a different subset of the common resource pool. In further cases, if a payload size of an uplink control information (UCI) transmission that provides the multiplexed feedback exceeds a size threshold, one or more portions of the multiplexed feedback may not be transmitted. For example, if the UCI payload size exceeds a first threshold value, only an ACK/NACK for the multicast communication may be transmitted (e.g., a one-bit ACK/NACK indication for each multicast transport block (TB)) and information related to the channel metric may be dropped. In the event that the UCI payload is at or less than the first threshold but greater than a second threshold, a portion of the channel metric information may be indicated (e.g., one or more bits to indicate a RSRP, but not geographic information such as beam information or location within a cell). In the event that the UCI payload is at or less than the second threshold value, all of the unicast, multicast, and channel metric information may be provided. In some cases, the threshold values may be associated with an amount of payload that is able to be transmitted in uplink resources that are provided in an uplink grant.

In some cases, the UE may provide one or more channel state information (CSI) reporting metrics with the multiplexed feedback, such as a channel quality indicator (CQI), precoding matrix indicator (PMI), rank indicator (RI), and the like, some or all of which may be transmitted based on available uplink resources. In still further cases, the multiplexed feedback may be provided that includes an uplink control channel resource identification that is mapped to joint feedback. In some cases, different portions of channel metric information may be transmitted in different multiplexed feedback communications. In some cases, the UE may transmit concurrent transmissions of the multicast feedback using the common resource pool and the unicast feedback using the corresponding uplink control channel resources. In some cases, such concurrent transmissions may be enabled based on a UE capability.

Techniques such as provided herein may thus allow for efficient use of communications resources while also providing feedback for both unicast and multicast communications. Further, such techniques may enhance reliability of communications through use of uplink resources specifically allocated to a particular UE for providing multicast and unicast feedback, which may reduce the likelihood of a collision of multiple UEs that select a same multicast resource for reporting multicast feedback. Thus, using multiplexed unicast and multicast feedback can enhance network throughput and reliability.

Aspects of the disclosure are initially described in the context of wireless communications systems. Examples of subsets of multicast feedback resources and multiplexed unicast and multicast feedback and then described. Aspects of the disclosure are further illustrated by and described with reference to process flows, apparatus diagrams, system diagrams, and flowcharts that relate to multiplexing multicast and unicast feedback.

FIG. 1 illustrates an example of a wireless communications system 100 that supports multiplexing multicast and unicast feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, base stations 105 and UEs 115 may use multicast communications and unicast communications, and UEs 115 may multiplex feedback associated with multicast and unicast communications in accordance with various techniques such as discussed herein. In some cases, multicast feedback resources may be configured in which different subsets of resources are partitioned based on UE 115 channel metric(s). UEs 115 that receive multicast communications may determine that a feedback indication is to be provided, and then determine a first subset of resources from the multiple subsets of resources based on its own channel metric. In cases where the multicast feedback and feedback for one or more unicast communications are to be provided in a same uplink control channel opportunity, a UE 115 may multiplex the unicast feedback and multicast feedback and transmit the multiplexed feedback to the base station 105. In some cases, the multiplexed feedback may provide an indication of the channel metric at the UE 115, an indication of the unicast feedback, and an indication of the multicast feedback.

Figure 2:
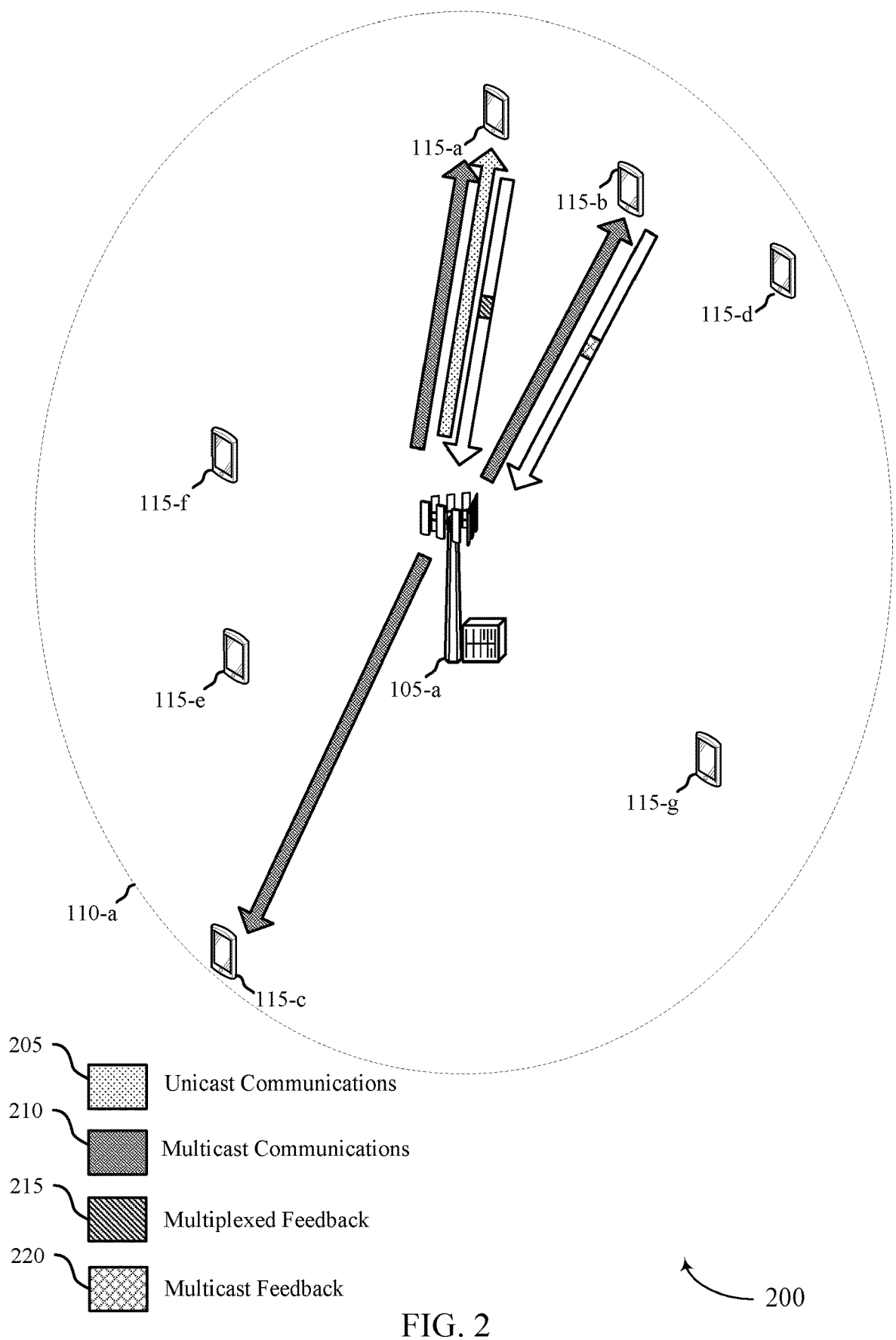
FIG. 2 illustrates an example of a portion of a wireless communications system that supports multiplexing multicast and unicast feedback in accordance with aspects of the present disclosure.

FIG. 2 illustrates an example of a wireless communications system 200 that supports multiplexing multicast and unicast feedback in accordance with aspects of the present disclosure. In some examples, wireless communications system 200 may implement aspects of wireless communications system 100. Wireless communications system 200 may include base station 105-*a* and a number of UEs 115, which may be examples of the corresponding devices described herein. Base station 105-*a* may have a corresponding coverage area 110-*a* that includes a plurality of UEs 115, with seven UEs 115-*a* through 115-*g* being shown by way of example only.

Wireless communications system 200 may support both unicast communications 205 and multicast communications 210. Unicast communications 205 may include transmissions from base station 105-*a* to a particular UE 115, such as UE 115-*a* as illustrated in this example. Multicast communications 210 may include transmissions from base station 105-*a* to a plurality of UEs 115. In the example illustrated in wireless communications system 200, base station 105-*a* performs multicast communications to a first UE 115-*a*, a second UE 115-*b*, and a third UE 115-*c*, although more or fewer UEs 115 may participate in any particular multicast communication 210. Unicast and multicast communications may be associated with corresponding feedback (e.g., HARQ ACK/NACK feedback). In cases where a UE 115 receives only unicast communications 205 and not multicast communications 210, feedback transmission is fairly straightforward as the resources for the feedback message are typically indicated in the grant scheduling the unicast communication 205. However, this approach may be more complicated in a multicast communication scenario as feedback resources may be configured in a common resource pool available for all UEs 115 to select from when transmitting feedback indications for the multicast communications 210.

That is, in a multicast cases some of the UEs 115 may successfully receive and decode the multicast communication 210, while other UEs 115 may be unable to do so.

Feedback information indicating which UEs 115 were able to successfully receive and decode a communication may provide base station 105-a with an indication of the "failure signatures" in the network, which may be used to tailor retransmissions and subsequent multicast communications 210. The UEs 115 in this scenario may be configured for a NACK-based or an ACK/NACK-based approach. In the ACK/NACK-based approach, every UE 115 receiving the multicast communication 210 responds with a multicast feedback message 220 indicating feedback information (e.g., either ACK or NACK) for the multicast communications 210. In the NACK-based approach, only UEs 115 that are unable to successfully receive and decode the multicast communications 210 provide the multicast feedback message 220 feedback information (e.g., NACK indication) to base station 105-a. In the example of FIG. 2, second UE 115-b may not successfully receive and decode the multicast communication 210, and may transmit multicast feedback 220 that indicates the NACK, while the third UE 115-a may successfully decode the multicast communication 210 and thus not transmit a corresponding feedback indication.

In cases where a UE 115, such as first UE 115-a, receives both multicast communications 210 and unicast communications 205, a multiplexed feedback message 215 may be provided to the base station 105-a. Such multiplexed feedback may include a feedback indication for the unicast communications 205, a feedback indication for one or more multicast communications 210, and an indication of one or more channel metrics associated with the UE 115, as discussed in various aspects herein. Such channel metrics may be beneficial to allow the base station 105-a to determine failure signatures and better tune subsequent retransmissions or multicast communications 210.

In some cases, multicast feedback 220 may be provided using the same PUCCH resources, e.g., common resources, across time, frequency, orthogonal sequence, and/or spatial resources. An example of such PUCCH resources is discussed herein with reference to FIG. 3. However, this common resource approach may be wasteful and, in some examples, ineffective. For example, in NACK-based feedback, lumping all of the resources into a common resource pool may result in waste when a low number of UEs 115 need to transmit a NACK indication. Moreover, this approach may be ineffective because UEs 115 selecting from the same resource pool increases the chance that there will be collisions in the feedback message transmissions.

Accordingly, in some cases, multiple partitions or subsets of multicast feedback resources may be provided that reduce the likelihood of collisions, and that also provide an indication of one or more channel metrics at the associated UE 115. At a high level, aspects of the described techniques consider the fact that UEs 115 in a good coverage area (e.g., characterized by high RSRP, low interference, etc.) are less probable (e.g., less likely to need to transmit a NACK indication in a feedback message) than UEs 115 located in a poor coverage area to provide feedback for multicast communications 210. Accordingly, multicast feedback resources (e.g., a set of resources), which may include orthogonal PUCCH sequences, for UEs 115 in good coverage areas may be able to support a larger degree of "resource overloading" across good coverage versus poor coverage area UEs 115. Moreover, in some aspects base station 105-a may be less interested in the identities of the UEs 115 that failed to successfully receive and decode the multicast communication, but may instead be more interested in the spatial signatures of UEs 115 experiencing failure (e.g., where such UEs 115 are located, which frequency/time/sequence resources such UEs are using, etc.).

Within this context, the notion of a good coverage area as compared to a poor coverage area may be defined in terms of a channel metric associated with each UE 115. At a high level, the channel metric may refer to the ability of each UE 115 to successfully communicate in the uplink and downlink with base station 105-a. That is, the channel metric may refer to the RSRP, reference signal strength indicator (RSSI), an angle-of-arrival/angle-of-departure (AoA/AoD) associated with beamformed communications with base station 105-a, a transmit/receive beam used for communications with base station 105-a, a geographical location of the UE 115 within the coverage area 110-a, an interference level, the CSI metric, a throughput level, and/or any other measurement, observation, and/or feature associated with the communication performance between base station 105-a and the UEs 115. In some aspects, each UE 115 may track or otherwise be aware of its channel metric (e.g., based on communications with base station 105-a).

In some aspects, base station 105-a may identify or otherwise select a set of multicast feedback resources for transmission of multicast feedback messages 220. The set of resources may include a plurality of subsets of resources, with each subset of resources associated with a corresponding channel metric (or channel metric range) for each UE 115 receiving the multicast communication. For example, each subset of resources may be associated with a corresponding range of channel metrics (e.g., a range of RSRP threshold values, a range of spatial features, a range of distances of the UE 115 from base station 105-a, a range of supported throughput values, and the like). Accordingly, each subset of resources may include one or more resources (e.g., time, frequency, sequences/code, and/or spatial resources) that can be used by a UE 115 having a corresponding channel metric for transmission of a feedback message in response to the multicast communication. In some aspects, the set of resources are evenly divided (e.g., uniform) according to the range of available channel metrics, or at least some of the subsets of resources may have different quantities (e.g., may not be uniform to provide an increased quantity of resources for UEs 115 with low channel metrics).

In cases where a multiplexed feedback message 215 is transmitted, the resources used for such a communication may be PUCCH resources that are associated with the unicast communications 205 (e.g., PUCCH resources indicated in a resource grant that provisions the unicast communication 205). In some cases, in order to provide for an indication of channel metric information, the different subsets of multicast feedback resources may have associated subset IDs, and the first UE 115-a can identify the subset of multicast resources that would have been used for multicast feedback and identify the corresponding subset ID in the multiplexed feedback message 215. In such cases, the base station 105-a may receive the associated channel metric information without an explicit multicast CSI trigger.

In some cases, the first UE 115-a may be configured with M different subsets of multicast feedback resources, each of which has an associated subset ID. In such cases, the first UE 115-a may include with the multiplexed feedback message 215 a number of bits for multicast feedback that correspond to $\log_2(M+1)$ (or, $\text{ciel}(\log_2(M+1))$ in the event that M is not a power of 2), per transport block (TB), to convey the subset ID associated with the multicast feedback resource subset it would have used in the absence of concurrent unicast multiplexing. The M+1 states include the state that multicast communication 210 is successfully received at the first UE 115-*a*, and thus these bits convey whether multicast is successful, and if not, which subset of multicast resources the first UE 115-*a* would have used.

In other cases, the multicast feedback may be provided in a number of bits in the multicast feedback message 220 that correspond to $1+\log_2 M$ bits (per TB), where one bit indicates ACK or NACK for multicast (or, ciel($1+\log_2(M)$) in the event that M is not a power of 2). In such cases, if the multicast feedback is ACK, the other $\log_2 M$ bits may be reserved/repurposed (e.g., to transmit unicast CSI feedback which may otherwise be dropped for payload restrictions. If the multicast feedback is NACK, the other $\log_2 M$ bits may be used to identify the subset ID of the corresponding subset of multicast feedback resources.

In other cases, the multicast feedback may be provided in an M-bit bitmap. In such cases, each bit location of the bitmap may be mapped to a particular subset ID of a subset of the multicast feedback resources.

In some cases, a payload size that is able to be transmitted in the multiplexed feedback message 215 may be limited based on an amount of PUCCH resources available for the feedback transmission. In some cases, when the multicast feedback combined with the unicast feedback would have an uncompressed payload size (i.e., the number of bits of feedback that would be transmitted if unlimited UCI resources were available) that exceeds an amount that can be transmitted in the multiplexed feedback message 215, a subset of the multicast feedback information may be provided. In some examples, one or more threshold values may be provided or determined for the multiplexed feedback message 215 (e.g., provided with configuration information or determined based on an amount of resources of an uplink grant). In some cases, if the payload size of the multiplexed feedback message 215 meets or exceeds a first threshold value (e.g., if UCI payload size $\geq T_1$), the first UE 115-*a* may provide only a single feedback bit per TB corresponding to multicast. If the payload size of the multiplexed feedback message 215 is less than the first threshold value and greater than or equal to a second threshold value (e.g., if UCI payload $\in [T_2,T_1)$), the first UE may indicate $1 \leq P \leq (1+\log_2 M)$ bits, where the P bits may only indicate the "RSRP part" and "not the zone part" of channel metric information. In such cases, if the multiplexed feedback message 215 has a payload that is less than the second threshold value (e.g., if UCI payload $< T_2$), the first UE 115-*a* may transmit all multicast feedback (e.g., $1+\log_2 M$ bits). In some cases, such determinations may be based on a number of multicast TBs that have feedback in a given uplink control channel occasion.

In some cases, one or more UEs 115 may be configured with a set of parameters (e.g., frequency-domain resources, PUCCH format to use, maximum coding rate for UCI, etc.), as well as higher-layer configurations enabling/disabling CSI-multiplexing on PUCCH, and the payload size may be determined based on such configurations. Based on the determined payload size, information included in uplink control information that provides the multiplexed feedback message 215 may be included/dropped based on associated priorities or a set of prioritization/dropping rules. Such information may include, for example, unicast ACK/NACK feedback, unicast channel metric(s), multicast ACK/NACK feedback, multicast channel metric(s), multicast NACK-only feedback, unicast scheduling request (SR), or any combinations thereof.

In some cases, the first UE 115-*a* may fallback to reporting one or more CSI reporting metrics (e.g., CQI/PMI/RI, etc.) with respect to the multicast communication. Such techniques may be more efficient than the $1+\log_2(M)$ or $\log_2(M+1)$ bits that may be required to report the entire multicast resource subset ID. In some cases, such a fallback mode may depend on the size of the UCI payload that the first UE 115-*a* has to transmit in the uplink control channel occasion.

In further cases, UEs 115 reporting multiplexed feedback messages 215 may be configured with a number of PUCCH resource IDs that are mapped to different combinations of feedback (e.g., different combinations of unicast/multicast feedback and resource subset IDs such as M, M+1, . . . , M+N−1, wherein N is the number of ACK/NACK bits), that are designed for joint feedback of unicast and multicast. In some cases, the UE 115 may fallback to using these resources, for example, if the unicast feedback payload itself is small (e.g., simply an ACK/NACK). In some cases, these PUCCH resources may have a joint initialization of their parameters (e.g., a cyclic shift) by a combination of unicast feedback and multicast feedback parameters. For example if one unicast and one multicast feedback are to have an ACK/NACK indication, a cyclic shift value 0 may indicate both failed, 1 may indicate unicast passed and multicast failed, 2 may indicate unicast failed and multicast passed, and 4 may indicate both passed. The UE 115-*a* would transmit the sequences from the same RSRP-based pool, but apply the appropriate cyclic-shift to the sequence to indicate the inherent multiplexing.

In some cases, the multicast feedback 220 may be associated with one multicast communication 210. In other cases, the multicast feedback 220 may be associated with multiple multicast communications 210, in which cases the channel metric portion of the feedback may be the same for multiple multicast TBs, while the ACK/NACK feedback portions may be provided for the individual TBs. For example, in some cases the plurality of different subsets of resources that are configured for multicast feedback may have a "multi-bit" initialization (e.g., initializing the cyclic shift of the PUCCH sequence) to transmit the multicast feedback on the resource determined from the channel metric. For example, if there are two multicast TBs to be NACK-ed in one uplink occasion, cyclic shift values 0,1,2 may be used to initialize PUCCH sequence (in the appropriate RSRP-based subset of resources) and indicate the feedback. When multiplexing feedback as discussed herein, an indication of the multiple multicast communications 220 may be provide in a first bitstream for the channel metric part, and an ACK/NACK bitstream that conveys whether and which of the multicast TBs failed. In other cases, the channel metric part is also potentially different for different multicast TBs. In such cases, multiple channel metric bitstreams and an ACK/NACK bitstream that conveys whether and which of the multicast TBs failed may be transmitted.

In some cases, the multiplexed feedback messages 215 may also include an optional set of bits to indicate the receive beam used for receiving multicast. In some cases, a receive beam indication may be quantized to some bits, where the base station 105-*a* (or other network component) can determine the beam with some degree of accuracy. In such cases, the multiplexed feedback 215 may provide $\log_2(M)+B$ bits (which may be rounded based on a floor or ceiling function associated with one or more valid sizes for the bitstreams to indicate subset IDs), where the receive beam may be indicated by "B" bits, and where a mapping of such bits to different receive beams may be configured by the base station 105-*a* (or other network component). Such receive beam indication may be an optional UCI payload, that may be enabled or disabled at UEs 115. In some cases, a subset of multiple multiplexed feedback message communications is determined at least in part on a higher layer parameter that provides a semi-static configuration of the multicast channel-metric reporting.

In some cases, unicast DCI may be used to schedule the unicast downlink transmission(s) and corresponding unicast uplink feedback. In other cases, a DCI may not schedule a unicast communication, but may trigger a CSI report or other UCI, that may be multiplexed with multicast feedback. Such DCIs may indicate, implicitly or explicitly, a size and the "parsing" of the UCI bitstream, considering the expected multicast feedback that is multiplexed with unicast feedback, other UCI, or combinations thereof. Such an indication may allow a UE 115 that misses the multicast scheduling to know that it should have received a multicast transmission, and the UE 115 may provide an expected format for the UCI that is decodable at the base station 105-a. A similar situation could occur when UCI is piggybacked on PUSCH, in which case there is a need for the network and the UE to both have a same expected UCI payload for a proper rate-matching pattern on PUSCH. In some cases, multiplexed multicast feedback may be provided as piggybacked feedback on PUSCH, where the multicast feedback bits for ACK/NACK may be punctured onto the PUSCH bitstream (i.e., the rate matching pattern does not depend on the presence/absence of the ACK/NACKs). In other cases, for piggybacked feedback on PUSCH, the unicast DCI scheduling PUSCH could indicate to the UE 115 the resources it has reserved for multicast-related feedback, for use in rate-matching around the feedback.

As discussed, in some cases the multiplexed feedback message 215 may provide only NACK information associated with multicast communications 210. In other cases, the multiplexed feedback message 215 may provide both ACK and NACK information. This may inform the network about information such as the UE RSRP level, receive beam, etc., for receiving multicast communications 210. In such cases, this may be $\log_2(M)$ bits worth of information.

In some cases, one or more channel metrics or portions thereof may not be transmitted every time the multicast feedback is sent in the multiplexed feedback message 215. Such channel metrics may be time-varying on a relatively slow time scale, and thus may be transmitted in fewer than all of the feedback messages. In some cases, whether to include one or more channel metrics, or portions thereof, may depend on the overall UCI payload. Because such metrics may change slowly, this information may be segmented into multiple smaller chunks of bits, which may be transmitted across multiple communications. In some cases, channel metrics or portions thereof to be provided in successive feedback communications may be configured at the UE 115, or may be determined in accordance with a predefined specification.

As discussed herein, in some cases all or portions of one or more channel metrics may be dropped in some instances of a multiplexed feedback messages 215. In some cases, which part of the channel metric(s) (e.g., CSI-related information) that are to be dropped may be jointly determined based on the multicast communications 210 and unicast communications 205. For example, if a unicast CSI report conveys necessary multicast-related information that allows the multicast channel metric to be inferred, the channel metric portion of the of multicast feedback (in terms of the $\log_2(M+1)$ or $(1+\log_2 M)$ bits as discussed herein) may be compressed or eliminated. Such a situation may occur if the unicast communication port(s) and the multicast communication port(s) have similar channel characteristics in some aspects. In some cases, the channel metric information to be transmitted or dropped may be determined based on one or more prioritization or dropping rules. In some cases, the channel metric information may be dropped based at least in part on one or more of whether the multicast communication 210 is successfully or unsuccessfully received (e.g., if successful, the multicast channel metric portion of the feedback may not be transmitted, and those bits may be available for unicast feedback), whether higher priority CSI reports are triggered by the base station 105-a (e.g., if there is an aperiodic CSI reporting trigger from the base station), or any combinations thereof. While unicast CSI may be dropped in some cases, other types of unicast UCI that have lower priority may be dropped in addition to, or alternatively to, unicast CSI.

In some cases, the first UE 115-a may be configured to provide a concurrent communication of unicast and multicast feedback, and in such cases channel characteristics (e.g., the "analog" portion of channel feedback) may be determined at the base station 105-a. In such cases, the first UE 115-a may have simultaneous transmission on PUCCH. Typically the PUCCH will use one beam, and if there is joint unicast/multicast feedback, the beam may be tailored for unicast. In cases with concurrent transmissions, the first UE 115-a may be effectively treated as "two UEs" and provided with two spreading sequences, etc., to use something like a $h_1 * x_1 + h_2 * x_2$ type transmission where subscript '1' corresponds to unicast UCI and beam, and subscript '2' corresponds to multicast UCI and beam. In other cases, concurrent transmission on PUCCH may be provided through concurrent transmission on two different frequencies (RBs) for multicast and unicast feedback. In some cases, such concurrent transmissions (e.g., of unicast+multicast, or of multiple multicasts) may be based on UE capabilities, and if the UE 115 does not indicate such capabilities, previous fallback options described herein may be used.

In some cases, it may happen that the unicast feedback resources of an uplink control channel transmission occasion (e.g., as dictated by the unicast DCI) may collide with an initial portion of multicast feedback resources. In this case, depending on UE processing capabilities and timelines, the multicast feedback may not be ready in time to be piggybacked/multiplexed on the unicast feedback. In such cases, the UE may have a different behavior than if its multicast feedback was ready to be transmitted. For example, the multicast feedback may be dropped entirely, may be transmitted in a subsequent uplink control channel occasion, etc.

Additionally, in some cases, multiple multicast services may be configured for one or more UEs 115. In some cases, the multiple multicast services may be NACK-ed together, and may use multicast feedback resources with "joint initialization" of PUCCH resource parameters (e.g. cyclic shifts) corresponding to different services, to provide an indication of each of the multicast services. In such cases, the different possible combinations of feedback indications may be associated with corresponding subset IDs for reporting in a multiplexed feedback message 215.

Figure 3:
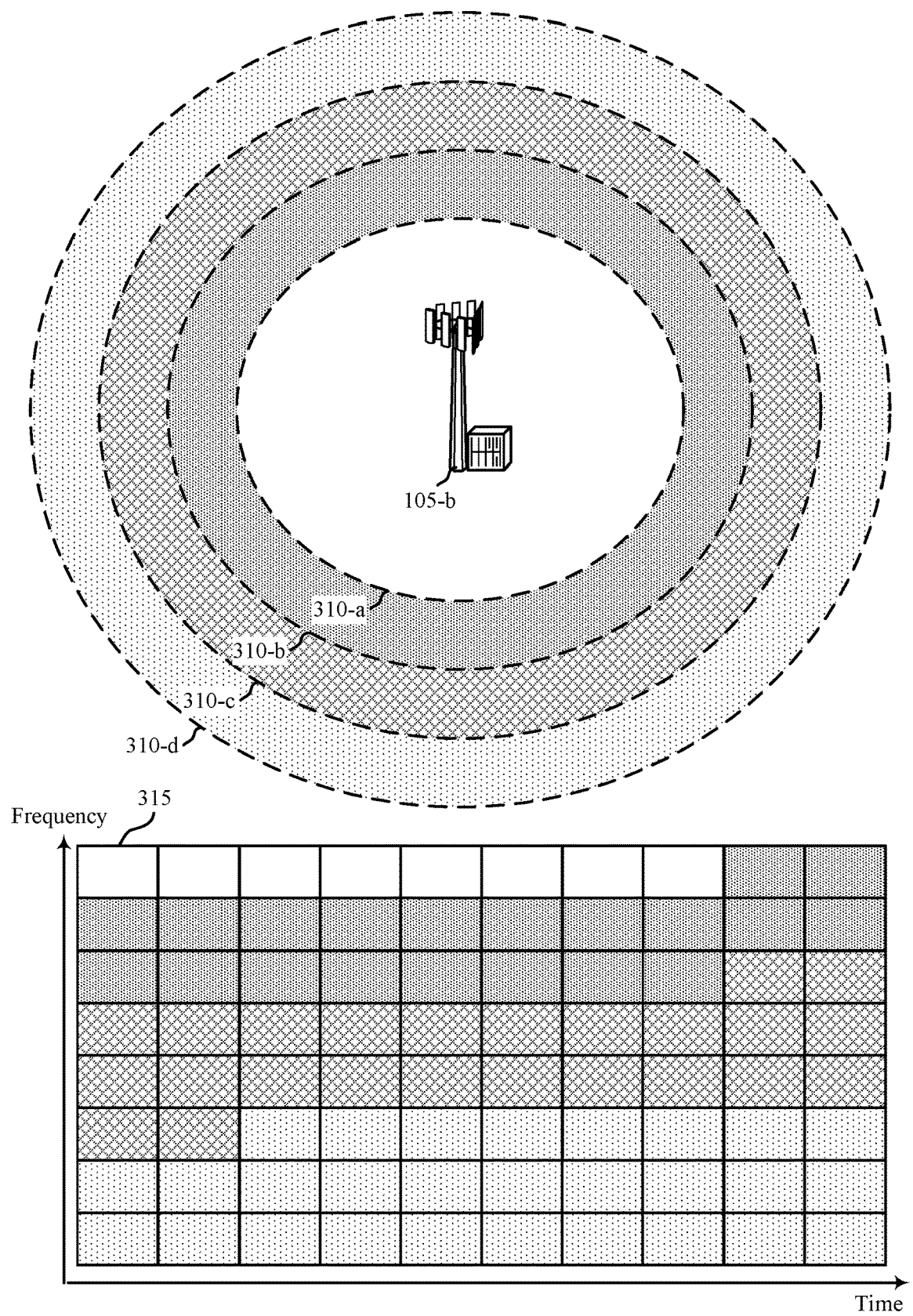
FIG. 3 illustrates an example of a partitioned multicast feedback resources that supports multiplexing multicast and unicast feedback in accordance with aspects of the present disclosure.

FIG. 3 illustrates an example of a partitioned multicast feedback resources in a wireless communications system 300 that supports multiplexing multicast and unicast feedback in accordance with aspects of the present disclosure. In some examples, partitioned multicast feedback resources may implement aspects of wireless communications system 100 or 200. Wireless communications system 300 may include base station 105-*b* and a plurality of UEs (not shown), which may be examples of the corresponding devices described herein.

As discussed, aspects of the described techniques may include base station 105-*b* configuring a plurality of UEs with a set of resources to use for transmission of a feedback message for a multicast communication, where the set of resources include a plurality of subsets of resources and each subset of resources is associated with a corresponding channel metric of the UE(s) transmitting the feedback messages. In accordance with various aspects, each of the subsets of resources may be configured with an associated subset ID, which may be used to identify a particular subset of the plurality of subsets of resources. For example, base station 105-*b* may identify or otherwise select the set of resources 315 and configure the UEs with the set of resources 315 via a configuration message (e.g., a higher layer signal, such as an RRC signal, MCCH signal, etc.). Each UE may then determine that a feedback indication (e.g., a NACK indication) is to be provided to base station 105-*b* in response to a multicast communication, and then select a subset of resources from the configured set of resources 315 based on its channel metric. That is, each UE having a feedback indication to provide may identify its own channel metric, determine which subset of resources is associated with that channel metric (e.g., is within the range), and then select the subset of resources from the plurality of subsets of resources to use for transmitting the feedback indication. The UE may then to transmit the feedback message to convey the feedback indication to base station 105-*b*. In cases where the multicast feedback is multiplexed with unicast feedback, a multiplexed feedback message may include the unicast feedback, multicast feedback, and an indication of the channel metric (e.g., an indication of the subset ID associated with the selected subset of resources).

Wireless communications system 300 illustrates one non-limiting example of how the plurality of subsets of resources may be configured according to the described techniques. That is, wireless communications system 300 provides an example illustration of a PUCCH resource allocation according to the described techniques. Broadly, base station 105-*b* has a corresponding coverage area within which it communicates with the plurality of UEs for the multicast communication. In the example illustrated in wireless communications system 300, the plurality of coverage areas are denoted as coverage areas 310, with coverage area 310-*d* being the farthest from base station 105-*b*, coverage area 310-*c* being the next closest coverage area to base station 105-*b*, coverage area 310-*b* being the next closest coverage area, and coverage area 310-*a* being the closest coverage area with respect to base station 105-*b*. As can be appreciated, a signal strength channel metric (e.g., RSRP) for UEs located within coverage area 310-*d* can generally be considered poorer or lower than the signal strength channel metric for UEs located within coverage area 310-*a*. For example, UEs located in coverage area 310-*a* may have a higher RSRP value or range than UEs located in coverage area 310-*b*. Similarly, UEs located in coverage area 310-*c* may have a higher RSRP value or range than UEs located in coverage area 310-*d*. Although the example illustrated in wireless communications system 300 generally relates to the distance each UE is located from base station 105-*b*, it is to be understood that other examples may relate to the direction of such UEs in relation to base station 105-*b*, the location of such UEs in relation to an obstructive object within a coverage area 310, and/or channel performance parameters within each coverage area 310, and the like.

Based on the performance differences of the UEs within the respective coverage areas 310, the plurality of subsets of resources may correspond to the different coverage areas 310. That is, also illustrated in FIG. 3 is the set of resources 315 that base station 105-*b* may configure for the UEs associated with the multicast communication. The set of resources 315 generally includes resource elements (REs) in the time domain (horizontal axis) and frequency domain (vertical axis). The set of resources 315 are divided into a plurality of subsets of resources, with each subset of resources corresponding to the different coverage areas 310 of base station 105-*b*. For example, a first subset of resources may include a quantity of eight REs (shown in clear) that correspond to the coverage area 310-*a* and have a first subset ID. That is, UEs located within coverage area 310-*a* may select the first subset of resources from the set of resources 315 if they are located within coverage area 310-*a* and/or have a channel metric associated with coverage area 310-*a*. As another example, a second subset of resources may include a quantity of 20 REs (shown in darker shade) that correspond to the coverage area 310-*b* and have a second subset ID. That is, UEs located within coverage area 310-*b* may select the second subset of resources from the set of resources 315 if they are located within coverage area 310-*b* and/or have a channel metric associated with coverage area 310-*b*. As another example, a third subset of resources may include a quantity of 24 REs (shown in cross-hatched lines) that correspond to the coverage area 310-*c* and have a third subset ID. That is, UEs located within coverage area 310-*c* may select the third subset of resources from the set of resources 315 if they are located within coverage area 310-*c* and/or have a channel metric associated with coverage area 310-*c*. As a final example, a fourth subset of resources may include a quantity of 28 REs (shown in lighter shade) that correspond to the coverage area 310-*d* and have a fourth subset ID. That is, UEs located within coverage area 310-*d* may select the fourth subset of resources from the set of resources 315 if they are located within coverage area 310-*d* and/or have a channel metric associated with coverage area 310-*d*.

Accordingly, more resources are allocated to UEs in poor coverage (e.g., coverage area 310-*d*) than UEs located in good coverage (e.g., coverage area 310-*a*). This approach may provide improved efficiency in PUCCH resource allocation where group NACK indications are being provided to base station 105-*b*. That is, the UEs may select a subset of resources from the set of resources 315 based on their respective channel metric, and then use one or more of the resources (e.g., RE(s)) in the selected subset of resources for transmitting a feedback message to base station 105-*b* in response to a multicast communication. As discussed above, the resources within a particular subset of resources (and/or for each subset of resources) may change (e.g., may be updated by base station 105-*b* based on the performance of the configured subset of resources). Moreover, the UEs may autonomously and/or coordinate with base station 105-*b* to update its selected subset of resources (e.g., based on changes to the channel metric of the UE).

Figure 4:
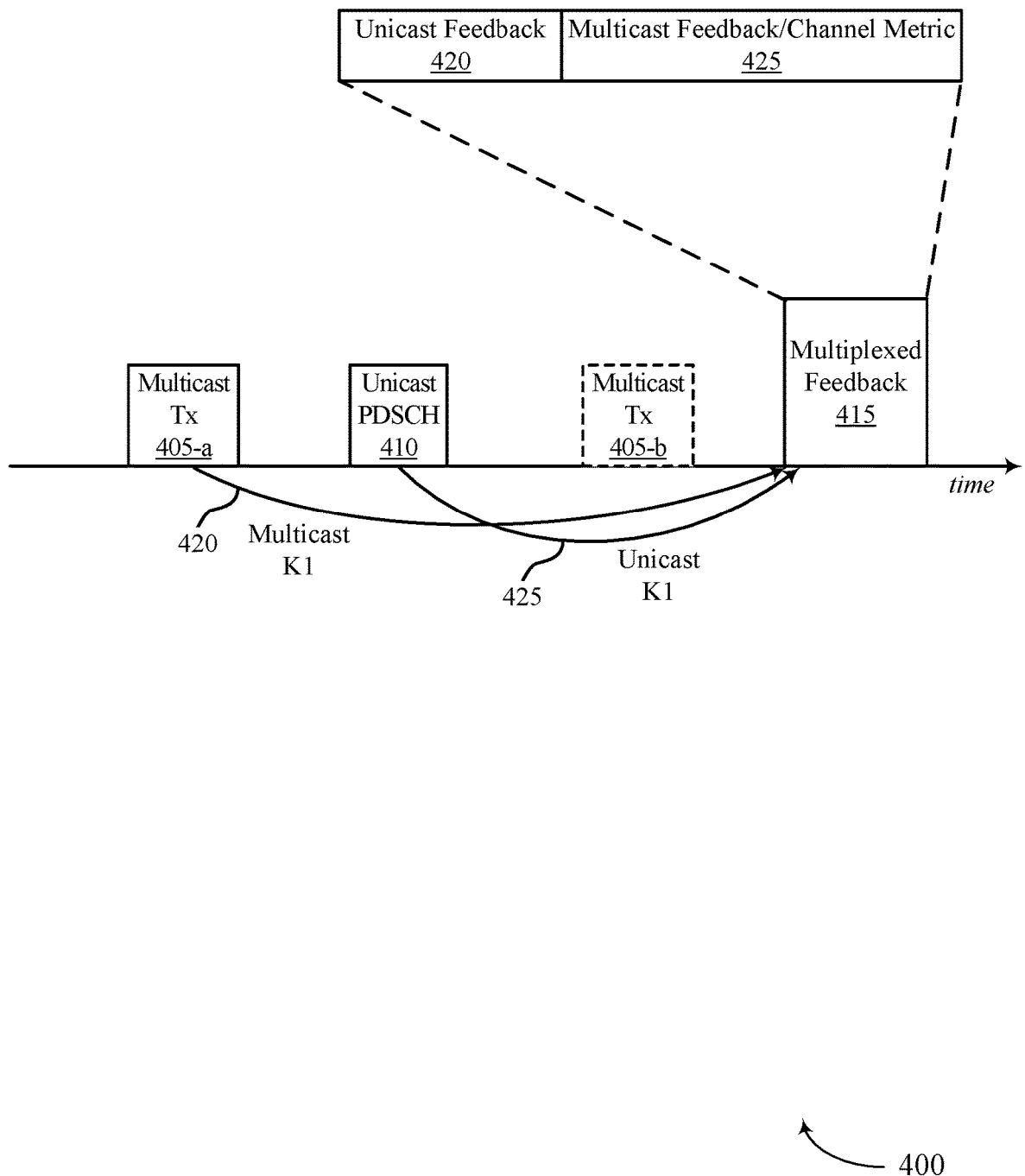
FIG. 4 illustrates an example of multiplexed feedback in accordance with aspects of the present disclosure.

FIG. 4 illustrates an example of a multiplexed feedback 400 that supports multiplexing multicast and unicast feedback in accordance with aspects of the present disclosure. In some examples, multiplexed feedback 400 may implement aspects of wireless communications system 100 or 200. In this example, a UE (e.g., a UE 115 as discussed herein) may be configured for multicast communications and for unicast communications. Further, the UE may be configured with multicast feedback resources that include a number of subsets of resources where each subset is associated with a different channel metric or set of channel metrics, as discussed herein.

In the example of FIG. 4, a UE may attempt to receive and decode multicast transmissions 405 as well as unicast PDSCH 410 transmissions, and determine corresponding feedback (e.g., HARQ ACK/NACK feedback, channel metric information, or both). As discussed herein, in some cases the DCI that schedules the unicast PDSCH 410 may also provide a resource allocation or an indication (e.g., a unicast K1 value that indicates when HARQ feedback is to be provided) of uplink resources for feedback transmission. In some cases, the common resources for multicast feedback may overlap with the uplink resources for the unicast feedback (e.g., both sets of feedback resources are associated with a same uplink control channel occasion). For example, multicast transmissions having a multicast K1 value that corresponds with an occurrence of the common resources for multicast feedback in a same PUCCH occasion as the unicast feedback resources. In such cases, the UE may use the unicast PUCCH resources to transmit multiplexed feedback 415 that includes the unicast feedback 420, the multicast feedback and channel metric 425 associated with the multicast transmissions 405.

As discussed with reference to FIG. 2, in some cases the multiplexed feedback 415 may include an indication of a subset ID that is selected for the multicast feedback to provide the channel metric indication, for example. In this example, the multiplexed feedback 415 may include multicast feedback for a first multicast transmission 405-a, but may not include feedback for a second multicast transmission 405-b due to, for example, the feedback timeline associated with the second multicast transmission 405-b providing that the associated multicast feedback will not be ready in time to be included with the multiplexed feedback 415. In some cases, the feedback for the second multicast transmission 405-b may be included in a subsequent set of common resources for multicast feedback, in a subsequent multiplexed feedback transmission, or in some cases it may be dropped.

In some cases, one or more portions of the multiplexed feedback 415 may be mapped to certain uplink resources. For example, multicast ACK/NACK bits may be mapped to be in resource elements (REs) that are closer to one or more demodulation reference signal (DMRS) REs in the PUCCH as opposed to bits that are used to convey the multicast channel metric, which can help to provide enhanced reliability for successful reception and decoding of the ACK/NACK bits. Such mapping may apply to both PUCCH-based feedback as well as piggybacked-PUSCH-based feedback. Further, in some cases multicast feedback may be multiplexed with other UCI in addition to or instead of unicast PDSCH ACK/NACK feedback, such as a CSI report, for example.

Figure 5:
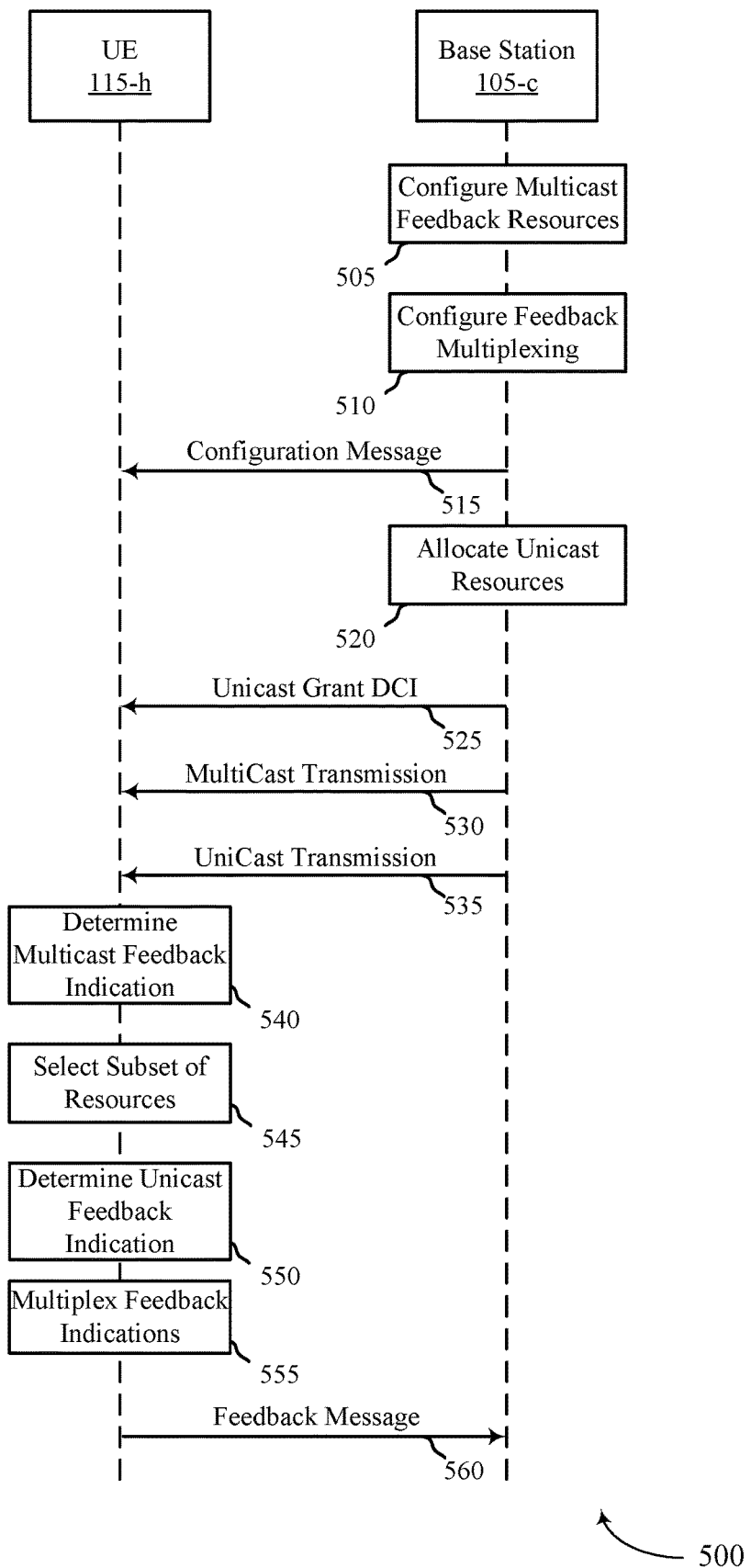
FIG. 5 illustrates an example of a process flow that supports multiplexing multicast and unicast feedback in accordance with aspects of the present disclosure.

FIG. 5 illustrates an example of a process flow 500 that supports multiplexing multicast and unicast feedback in accordance with aspects of the present disclosure. In some examples, process flow 500 may implement aspects of wireless communications system 100, 200, or 300. Process flow 500 may be implemented by a UE 115-h and a base station 105-c as described herein. In the following description of the process flow 500, the communications between the UE 115-h and the base station 105-c may be transmitted in a different order than the example order shown, or the operations performed by the UE 115-h and base station 105-c may be performed in different orders or at different times. Some operations may also be omitted from the process flow 500, and other operations may be added to the process flow 500.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, base station 105-c may configure multicast communications, including multicast feedback resources. In some cases, the base station 105-c may identify or otherwise select a set of common resources (e.g., PUCCH resources or multicast resources) available for use by a plurality of UEs (including UE 115-h) for transmission of feedback indications for a multicast communication to the plurality of UEs. The set of common resources may include a plurality of subsets of resources, with each subset of resources being associated with a corresponding channel metric for each UE. For example, each subset of resources may be associated with a different range of channel metrics, different combinations of channel metrics (e.g., combinations of geographically-based metrics and performance-based metrics), or combinations thereof. In some cases, each of the plurality of subsets of resources may be configured with a subset ID, which may be used in multiplexed feedback to indicate the channel metric(s) of the UE 115-h related to multicast communications.

At 510, base station 105-c may configure feedback multiplexing, which may allow unicast feedback and multicast feedback to be multiplexed. In some cases, the configuration of feedback multiplexing may be based on UE 115-h capability (e.g., as determined by a UE capability indication provided by the UE 115-h).

At 515, base station 105-c may transmit (and UE 115-h may receive) a configuration message identifying the set of resources. In some cases, the configuration message may also provide information for feedback multiplexing. In some aspects, the configuration message may be a higher layer message, e.g., RRC message, MCCH message, and the like. The configuration message may be transmitted in a higher layer message (e.g., an RRC message, a multicast control channel (MCCH) signal, and the like) transmitted to the UEs receiving the multicast communication. As discussed, the allocation of the set of resources may be based on the signal strength/quality of the multicast reception at each UE (e.g., may depend on the RSRP threshold, angular directions in altitude and azimuth, transmit/receive beams, geographical locations, etc.). Broadly, combining the indicators discussed above (e.g., the channel metrics) with the higher layer signaling, the UE 115-h may be able to determine or otherwise select a subset of resources from the set of resources based on its channel metric.

At 520, the base station 105-c may allocate unicast resources. As discussed herein, the unicast resources may include PDSCH and PUCCH resources associated with a unicast transmission and associated unicast feedback. At 525, the base station 105-c may transmit a unicast grant DCI, which indicated the corresponding unicast resources that are allocated to the UE 115-h.

At 530, base station 105-c may transmit a multicast communication to the UE 115-h, and one or more other UEs.

In some cases, any multi-UE transmission may be considered the multicast communication. That is, any transmission that is for multiple UEs may be considered the multicast communication. At 535, the base station 105-c may transmit unicast transmission to the UE 115-h. In some cases, as discussed herein, multiplexed feedback may include multicast feedback and UCI in addition to or other than unicast ACK/NACK feedback, and thus in some cases the unicast transmission to the UE 115-h is optional.

At 540, UE 115-h may determine that a feedback indication (e.g., an ACK/NACK indication) is to be provided to base station 105-c in response to the multicast communication. That is, UE 115-h may determine whether it was able to successfully receive and decode the multicast communication from base station 105-c. Accordingly, UE 115-h may determine whether to provide an ACK or NACK indication to transmit to base station 105-c in response to the multicast communication. In some cases, multicast feedback may be provided only in the event of a NACK indication. In other cases, multicast feedback may be provided for either ACK or NACK indications.

At 545, UE 115-h may select, based on a channel metric of UE 115-h, a first subset of resources from the plurality of subsets of the multicast resources. For example, UE 115-h may identify or otherwise determine its channel metric, and then select a first subset of resources from the plurality of subsets of resources based on the channel metric. In some aspects, the channel metric may include, alone or in any combination, an RSRP, and RSSI, a beamform AoA/AoD, a transmit beam, a receive beam, a geographical location, an interference level, the CSI metric, a throughput level, and the like. In some aspects, this may include UE 115-h determining that its channel metric has changed beyond a threshold. In this situation, UE 115-h may, based on the changed channel metric, autonomously and/or via coordination with base station 105-c select an updated subset of resources to use for transmitting the feedback message.

At 550, the UE 115-h may determine a unicast feedback indication. For example, the UE 115-h may determine HARQ ACK/NACK feedback for one or more TBs of the unicast transmission.

At 555, the UE 115-h may multiplex the unicast feedback and the multicast feedback. The multiplexing of the feedback may performed in accordance with techniques such as discussed herein, and may include unicast feedback information, multicast feedback information, and channel metric information. At 560, UE 115-h may transmit (and base station 105-c may receive) a feedback message conveying the multiplexed feedback for the unicast communications and the multicast communications, and using resources associated with the unicast grant.

Figure 6:
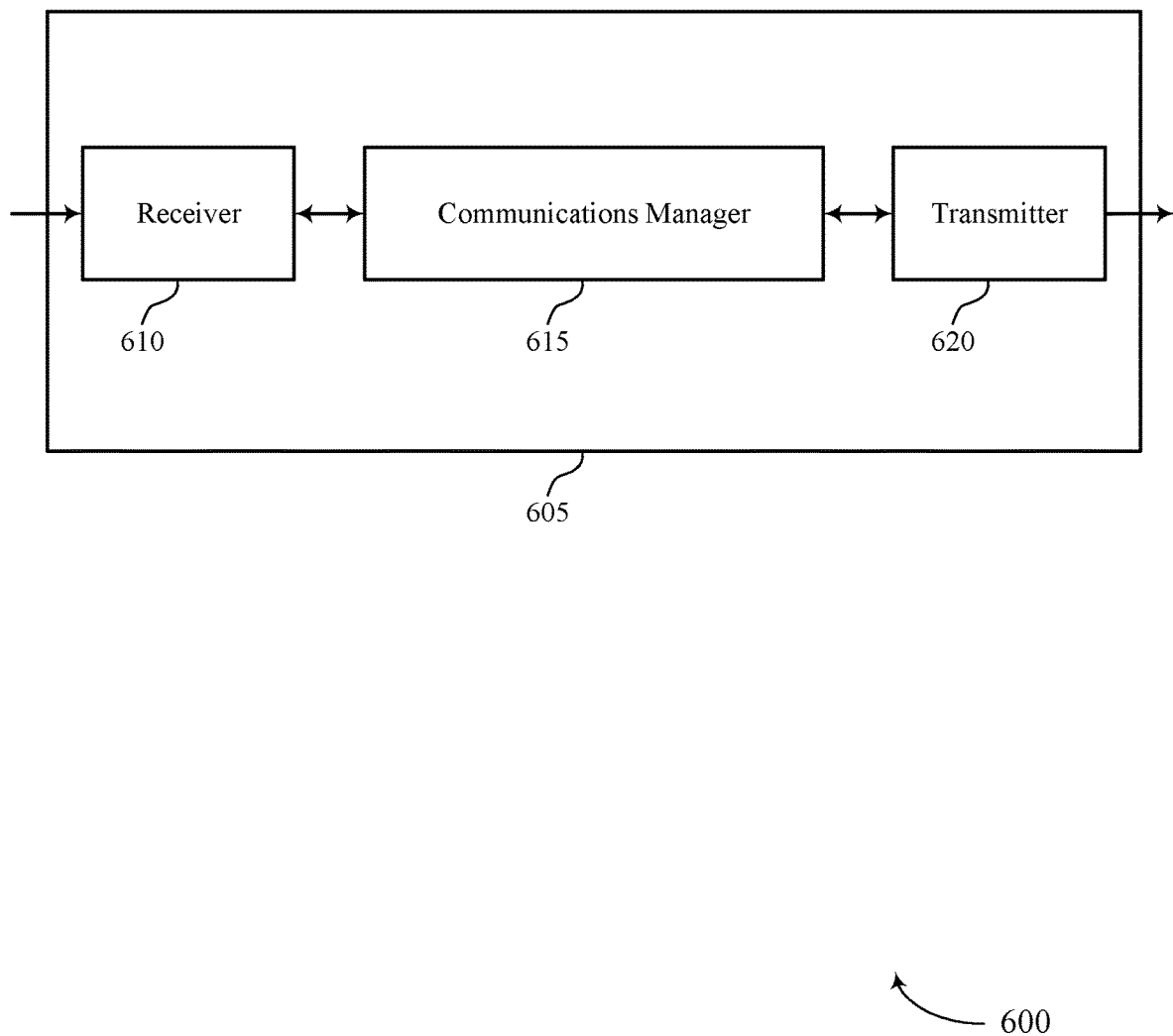
FIGS. 6 and 7 show block diagrams of devices that support multiplexing multicast and unicast feedback in accordance with aspects of the present disclosure.

FIG. 6 shows a block diagram 600 of a device 605 that supports multiplexing multicast and unicast feedback in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multiplexing multicast and unicast feedback, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric, determine that both the multicast feedback indication and a unicast feedback indication are to be provided in a first uplink transmission occasion, where the unicast feedback indication is associated with one or more unicast communications to the UE, multiplex the unicast feedback indication, the multicast feedback indication, and an indication of the first subset of multicast feedback resources into a multiplexed feedback message for transmission in the first uplink transmission occasion, and transmit the multiplexed feedback message in the first uplink transmission occasion. The communications manager 615 may be an example of aspects of the communications manager 910 described herein.

The communications manager 615 may as described herein be implemented to realize one or more potential advantages. One implementation may allow the device 605 to provide multiplexed feedback using unicast resources rather than common resources, which may enhance the likelihood of successful reception of the feedback and allow for indication of channel metrics associated with multicast feedback for refinement one or more multicast transmission parameters that may enhance the likelihood of successful reception of multicast communications. Further, implementations may allow the device 605 to increase multicast communications reliability, throughput, and user experience, while reducing overall power consumption, among other advantages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
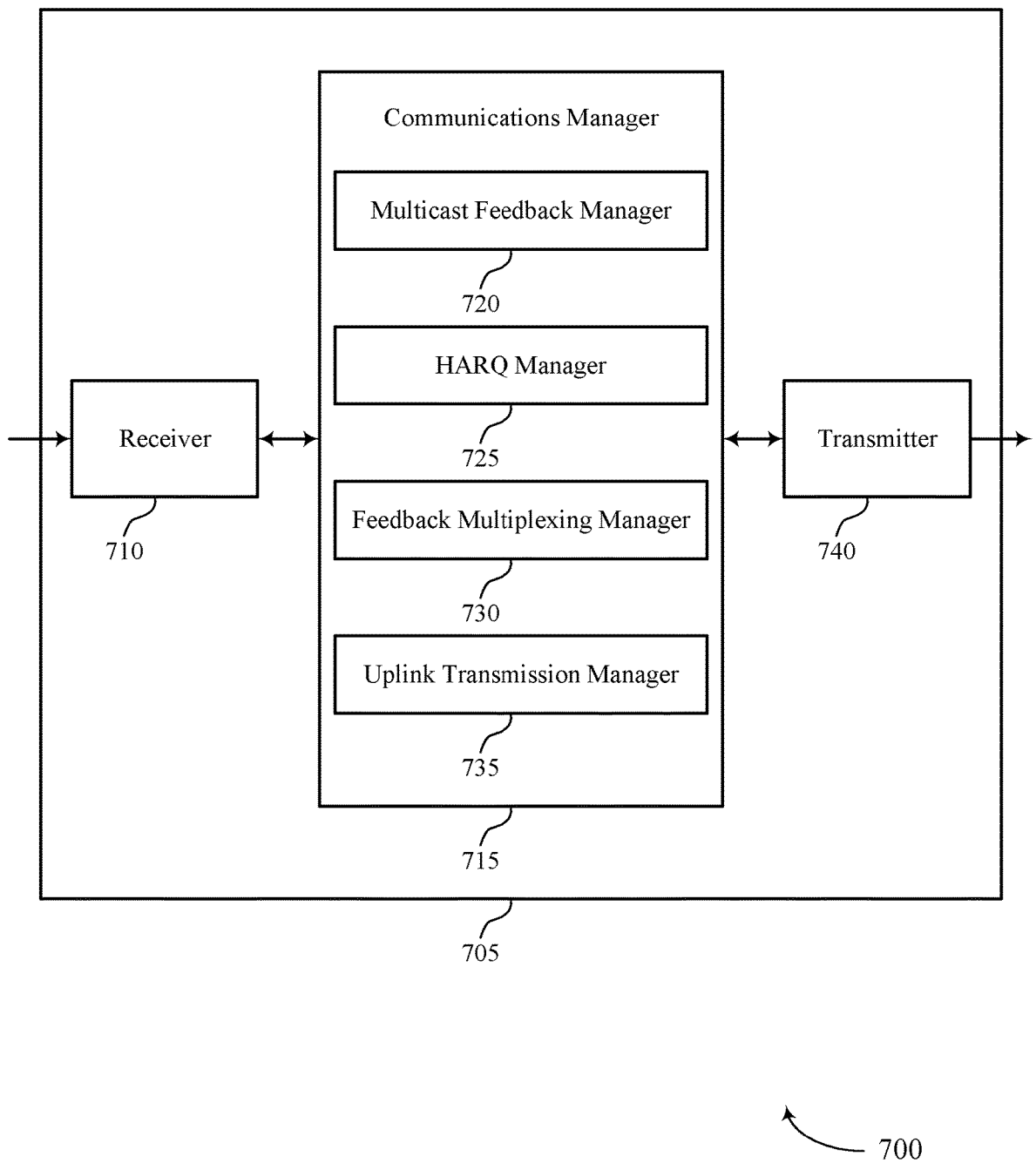

FIG. 7 shows a block diagram 700 of a device 705 that supports multiplexing multicast and unicast feedback in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to multiplexing multicast and unicast feedback, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a multicast feedback manager 720, a HARQ manager 725, a feedback multiplexing manager 730, and an uplink transmission manager 735. The communications manager 715 may be an example of aspects of the communications manager 910 described herein.

The multicast feedback manager 720 may determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric.

The HARQ manager 725 may determine that both the multicast feedback indication and a unicast feedback indication are to be provided in a first uplink transmission occasion, where the unicast feedback indication is associated with one or more unicast communications to the UE.

The feedback multiplexing manager 730 may multiplex the unicast feedback indication, the multicast feedback indication, and an indication of the first subset of multicast feedback resources into a multiplexed feedback message for transmission in the first uplink transmission occasion.

The uplink transmission manager 735 may transmit the multiplexed feedback message in the first uplink transmission occasion.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
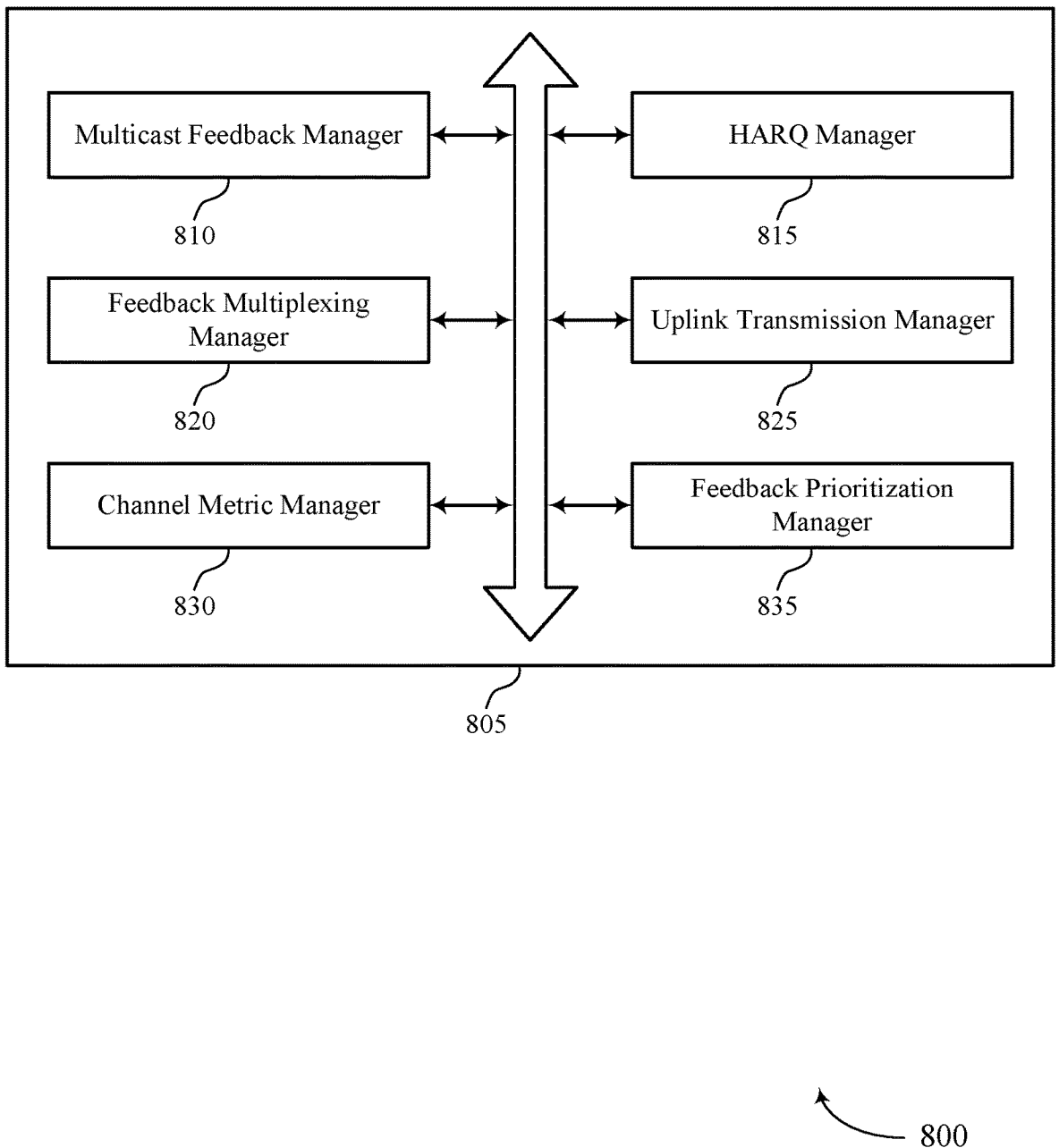
FIG. 8 shows a block diagram of a communications manager that supports multiplexing multicast and unicast feedback in accordance with aspects of the present disclosure.

FIG. 8 shows a block diagram 800 of a communications manager 805 that supports multiplexing multicast and unicast feedback in accordance with aspects of the present disclosure. The communications manager 805 may be an example of aspects of a communications manager 615, a communications manager 715, or a communications manager 910 described herein. The communications manager 805 may include a multicast feedback manager 810, a HARQ manager 815, a feedback multiplexing manager 820, an uplink transmission manager 825, a channel metric manager 830, and a feedback prioritization manager 835. Each of these modules may communicate, directly or indirectly, with one another (e.g., via one or more buses).

The multicast feedback manager 810 may determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric. In some examples, the multicast feedback manager 810 may determine whether to transmit an explicit value of the channel metric associated with the one or more multicast communications, or the indication of the first subset of multicast feedback resources, with the multiplexed feedback message. In some cases, the determining whether to transmit the explicit value of the channel metric is based on an available payload size for the multiplexed feedback message in the first uplink transmission occasion.

In some cases, the indication of the first subset of multicast feedback resources is provided based on an uplink control channel resource identification used to transmit the multiplexed feedback message. In some cases, a set of uplink control channel resource identifications have a joint initialization of associated parameters that are mapped to different unicast or multicast feedback parameters. In some cases, the joint initialization includes a different cyclic shift that is applied based on a feedback value of the multicast feedback, the unicast feedback, or combinations thereof.

The HARQ manager 815 may determine that both the multicast feedback indication and a unicast feedback indication are to be provided in a first uplink transmission occasion, where the unicast feedback indication is associated with one or more unicast communications to the UE.

The feedback multiplexing manager 820 may multiplex the unicast feedback indication, the multicast feedback indication, and an indication of the first subset of multicast feedback resources into a multiplexed feedback message for transmission in the first uplink transmission occasion. In some examples, the feedback multiplexing manager 820 may determine an available payload size of the multiplexed feedback message based on resources of the first uplink transmission occasion.

In some examples, the feedback multiplexing manager 820 may determine a number of bits to include in the multicast feedback indication, the unicast feedback indication, or combinations thereof. In some examples, the feedback multiplexing manager 820 may determine to include only acknowledgment or negative-acknowledgment feedback in the multicast feedback indication, and only acknowledgment or negative-acknowledgment feedback in the unicast feedback indication, when the available payload size is less than a first threshold value. In some examples, the feedback multiplexing manager 820 may determine to include acknowledgment or negative-acknowledgment feedback in the multicast feedback indication and the unicast feedback indication, and a unicast channel metric, when the available payload size is between the first threshold value and a second threshold value. In some examples, the feedback multiplexing manager 820 may determine to include acknowledgment or negative-acknowledgment feedback and the indication of the first subset of multicast feedback resources in the multicast feedback indication, and to include acknowledgment or negative-acknowledgment feedback and the unicast channel metric in the unicast feedback indication, when the available payload size is at or above the second threshold value. In some examples, the feedback multiplexing manager 820 may multiple multiplexed feedback message communications are transmitted corresponding to multiple multicast communications, and where different portions of channel metric information associated with the multicast communications are transmitted in different multiplexed feedback messages, and where the channel metric information associated with the multicast communications are assumed to be identical across the multiple multiplexed feedback message communications.

In some examples, the feedback multiplexing manager 820 may transmit separate concurrent transmissions that indicate the multicast feedback indication and the unicast feedback indication. In some examples, the feedback multiplexing manager 820 may determine to drop one or more multicast feedback indications from the multiplexed feedback message based on a timeline between the multicast communication and the first uplink control channel occasion.

In some cases, the multicast feedback indication includes a subset identification corresponding to the first subset of multicast feedback resources. In some cases, the multiplexed feedback message includes a first subset of bits associated with the unicast feedback indication and a second subset of bits associated with the multicast feedback indication and the subset identification. In some cases, the second subset of bits indicate a number of states associated with a number of the set of subsets of multicast feedback resources and a state that indicates whether at least one of the one or more multicast communications was successfully received. In some cases, the multiplexed feedback message further includes a third subset of bits that indicates a beam used at the UE for receiving the one or more multicast communications.

In some cases, the multicast feedback indication provides feedback for multiple multicast transport blocks (TBs) of the one or more multicast communications. and where the channel metric associated with the first subset of multicast feedback resources applies to each of the multiple multicast TBs. In some cases, the multicast feedback indication includes a first bitstream that indicates the first subset of multicast feedback resources and a second bitstream that indicates an acknowledgment or negative acknowledgment for each of the one or more multicast communications.

In some cases, the multiplexed feedback message includes a first subset of bits associated with the unicast feedback indication and a second subset of bits associated with the multicast feedback indication, and where the second subset of bits indicates whether the one or more multicast communications were successfully received and includes one or more additional bits that indicate a subset identification associated with the first subset of the set of subsets of multicast feedback resources. In some cases, the one or more additional bits are reserved or reused when acknowledgment feedback is provided for each of the one or more multicast communications. In some cases, the one or more additional bits are reused to provide unicast uplink control information.

In some cases, the multiplexed feedback message includes a bitmap that indicates which subset of the set of subsets of multicast feedback resources selected at the first subset at the UE. In some cases, the number of bits to include in the multicast feedback indication is further based on a number of multicast transport blocks that have feedback to be reported.

In some cases, the multiplexed feedback message indicates an acknowledgment of receipt of the one or more multicast communications and the indication of the first subset of multicast feedback resources to provide an indication of channel metrics associated with the one or more multicast communications. In some cases, the multiplexed feedback message includes one or more bits that indicate the channel metric for the multicast feedback indication in a subset of multiple multiplexed feedback message communications, and where one or more other multiplexed feedback message communications indicate only an acknowledgment or negative-acknowledgment of the corresponding multicast communication. In some cases, the subset of multiple multiplexed feedback message communications is determined based at least in part of a higher layer parameter.

In some cases, the multiplexed feedback message includes a first subset of bits associated with acknowledgment or negative-acknowledgment indications for the one or more multicast communications, and a second subset of bits associated with the channel metric of the UE, and where the first subset of bits is mapped to be closer to a reference signal of the first uplink transmission occasion than the second subset of bits.

The uplink transmission manager 825 may transmit the multiplexed feedback message in the first uplink transmission occasion. In some examples, the uplink transmission manager 825 may transmit, in the first uplink transmission occasion, two or more concurrent multiplexed feedback messages for each of two or more multicast communications, each of the two or more concurrent multiplexed feedback messages providing an associated multicast feedback indication and an associated subset of multicast feedback resources. In some cases, the separate concurrent transmissions are transmitted via separate beams, via different resource blocks, or any combinations thereof. In some cases, the separate concurrent transmissions are enabled based on a capability of the UE.

In some examples, the uplink transmission manager 825 may receive DCI that provides a downlink grant for at least one of the one or more of the unicast communications and an indication of uplink resources for the first uplink transmission occasion, where the DCI indicates that the multiplexed feedback message is to be transmitted in the first uplink transmission occasion.

In some examples, the uplink transmission manager 825 may receive DCI that provides a downlink grant for at least one of the one or more of the unicast communications and an indication that the multicast feedback indication is to be piggybacked with shared channel data in an uplink shared channel communication. In some cases, the uplink transmission occasion is an uplink control channel occasion or an uplink shared channel occasion in which control information is piggybacked with shared channel data. In some cases, the UE transmits the multiplexed feedback message responsive to the DCI irrespective of whether the UE received multicast scheduling information associated with the one or more multicast communications. In some cases, the piggybacked multicast feedback indication is punctured onto the shared channel data in the uplink shared channel communication. In some cases, the DCI further indicates reserved resources within the uplink shared channel communication that are to be used for the piggybacked multicast feedback indication.

The channel metric manager 830 may determine that the one or more multicast communications have an associated channel metric that can be inferred from channel state information associated with the one or more unicast communications. In some examples, the channel metric manager 830 may transmit only channel metric information associated with the one or more unicast communications in the multiplexed feedback message.

The feedback prioritization manager 835 may determine one or more portions of unicast feedback, multicast feedback, or combinations thereof, that are to be included with the multiplexed feedback message based on one or more prioritization or dropping rules.

In some examples, the feedback prioritization manager 835 may positive or negative acknowledgement feedback indications of the multicast communication(s) have priority over multicast channel metric feedback and unicast channel metric feedback. In some cases, a first component of multicast channel metric feedback has priority over one or more other components of multicast channel metric feedback. In some cases, a first component of channel state information feedback associated with the unicast feedback indication have priority over all or a portion of multicast feedback indications.

Figure 9:
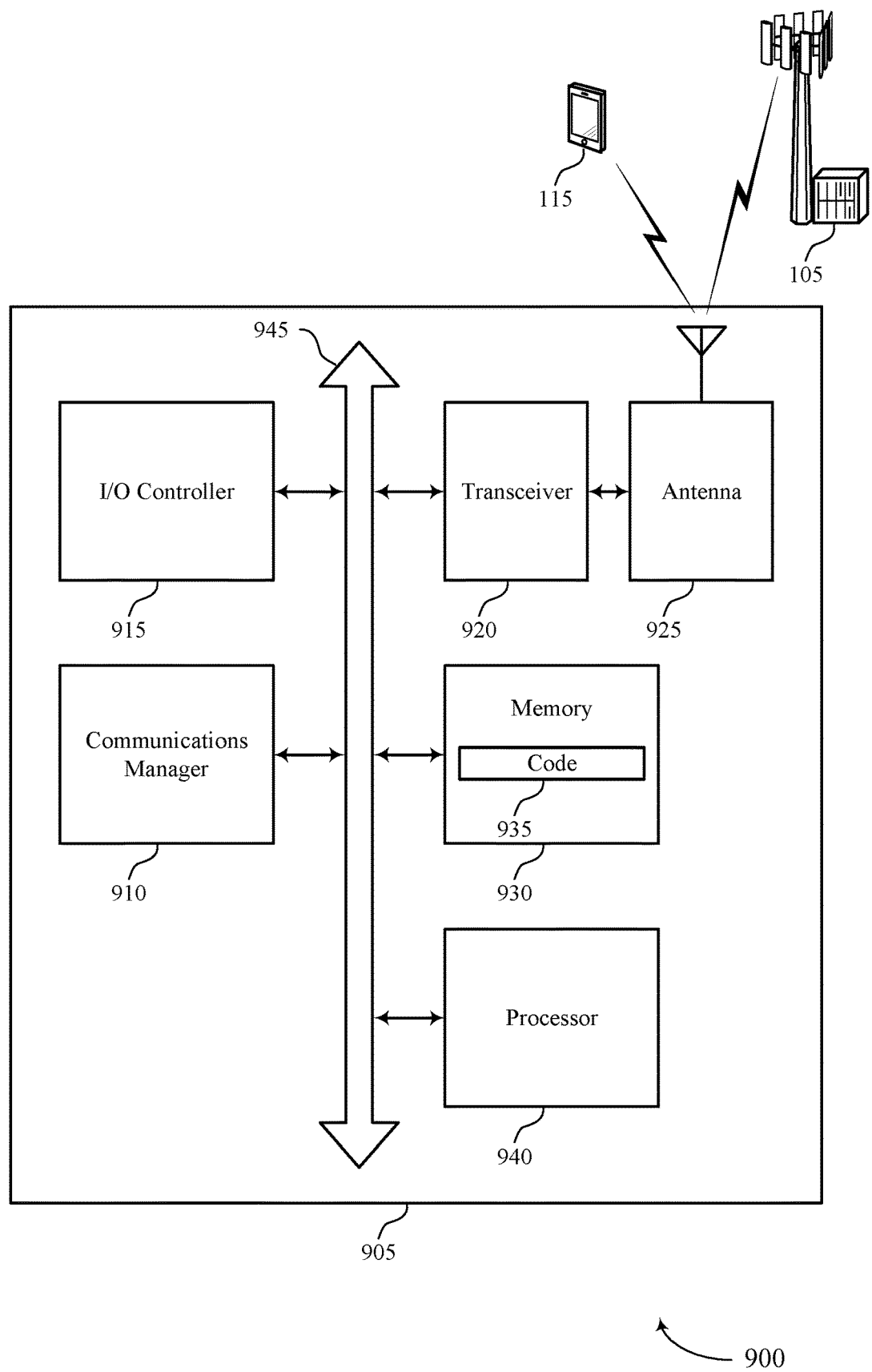
FIG. 9 shows a diagram of a system including a device that supports multiplexing multicast and unicast feedback in accordance with aspects of the present disclosure.

FIG. 9 shows a diagram of a system 900 including a device 905 that supports multiplexing multicast and unicast feedback in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric, determine that both the multicast feedback indication and a unicast feedback indication are to be provided in a first uplink transmission occasion, where the unicast feedback indication is associated with one or more unicast communications to the UE, multiplex the unicast feedback indication, the multicast feedback indication, and an indication of the first subset of multicast feedback resources into a multiplexed feedback message for transmission in the first uplink transmission occasion, and transmit the multiplexed feedback message in the first uplink transmission occasion.

The communications manager 910 may as described herein be implemented to realize one or more potential advantages. One implementation may allow the device 905 to provide multiplexed feedback using unicast resources rather than common resources, which may enhance the likelihood of successful reception of the feedback and allow for indication of channel metrics associated with multicast feedback for refinement one or more multicast transmission parameters that may enhance the likelihood of successful reception of multicast communications. Further, implementations may allow the device 905 to increase multicast communications reliability, throughput, and user experience, while reducing overall power consumption, among other advantages.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multiplexing multicast and unicast feedback).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
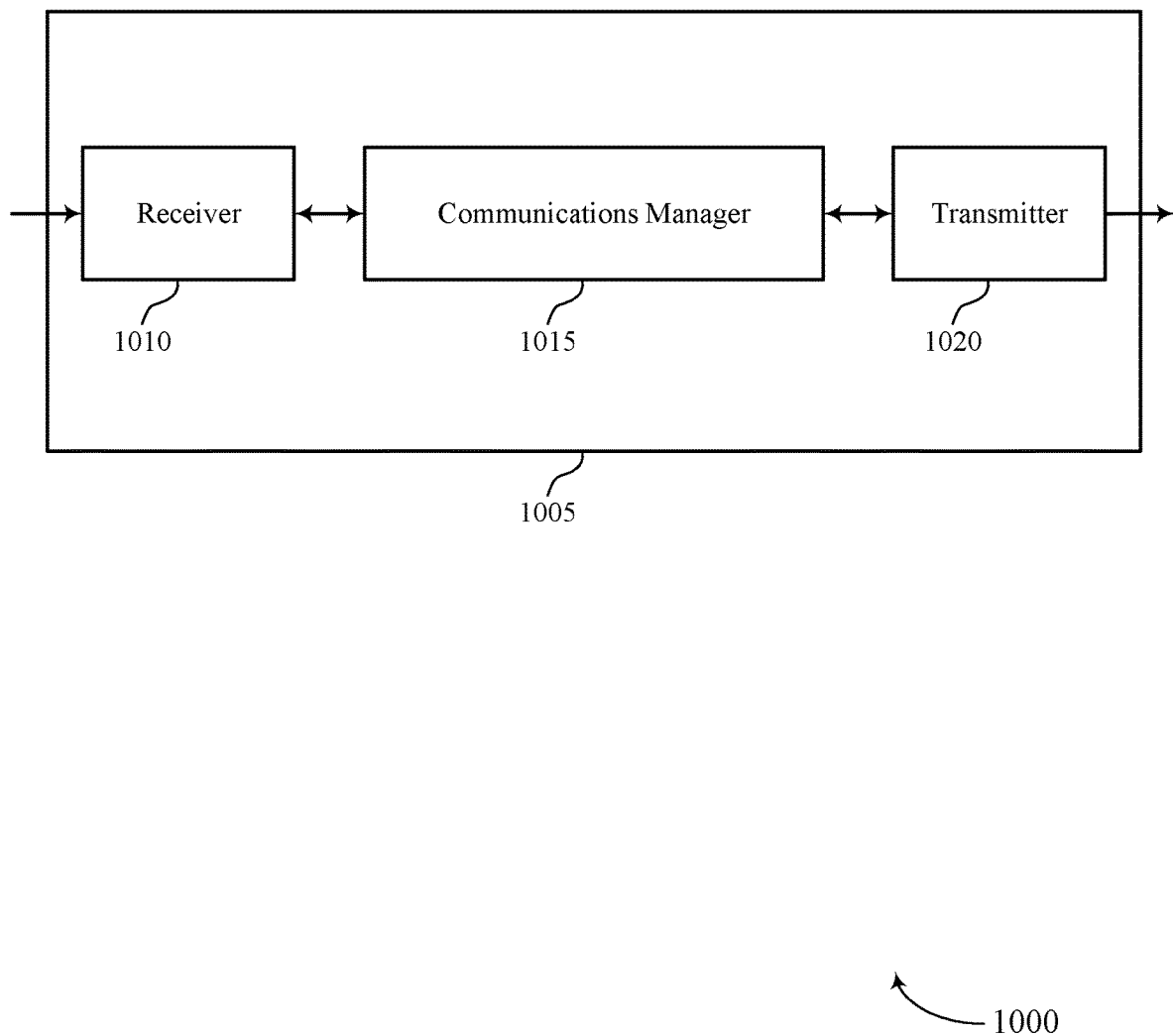
FIGS. 10 and 11 show block diagrams of devices that support multiplexing multicast and unicast feedback in accordance with aspects of the present disclosure.

FIG. 10 shows a block diagram 1000 of a device 1005 that supports multiplexing multicast and unicast feedback in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to multiplexing multicast and unicast feedback, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may configure a first UE with a set of subsets of multicast feedback resources to use for providing a multicast feedback indication associated with one or more multicast communications, where each subset of the set of subsets of multicast feedback resources is associated with a different corresponding channel metric, allocate, to the first UE, uplink resources in at least a first uplink transmission occasion for communication of feedback information from the first UE, transmit a multicast communication to a set of UEs including the first UE, transmit a unicast communication to the first UE, where both the multicast feedback indication and a unicast feedback indication are to be provided in the first uplink transmission occasion, and receive, from the first UE in the first uplink transmission occasion, a multiplexed feedback message that multiplexes the unicast feedback indication, the multicast feedback indication, and an indication of a first subset of multicast feedback resources associated with a first channel metric at the first UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
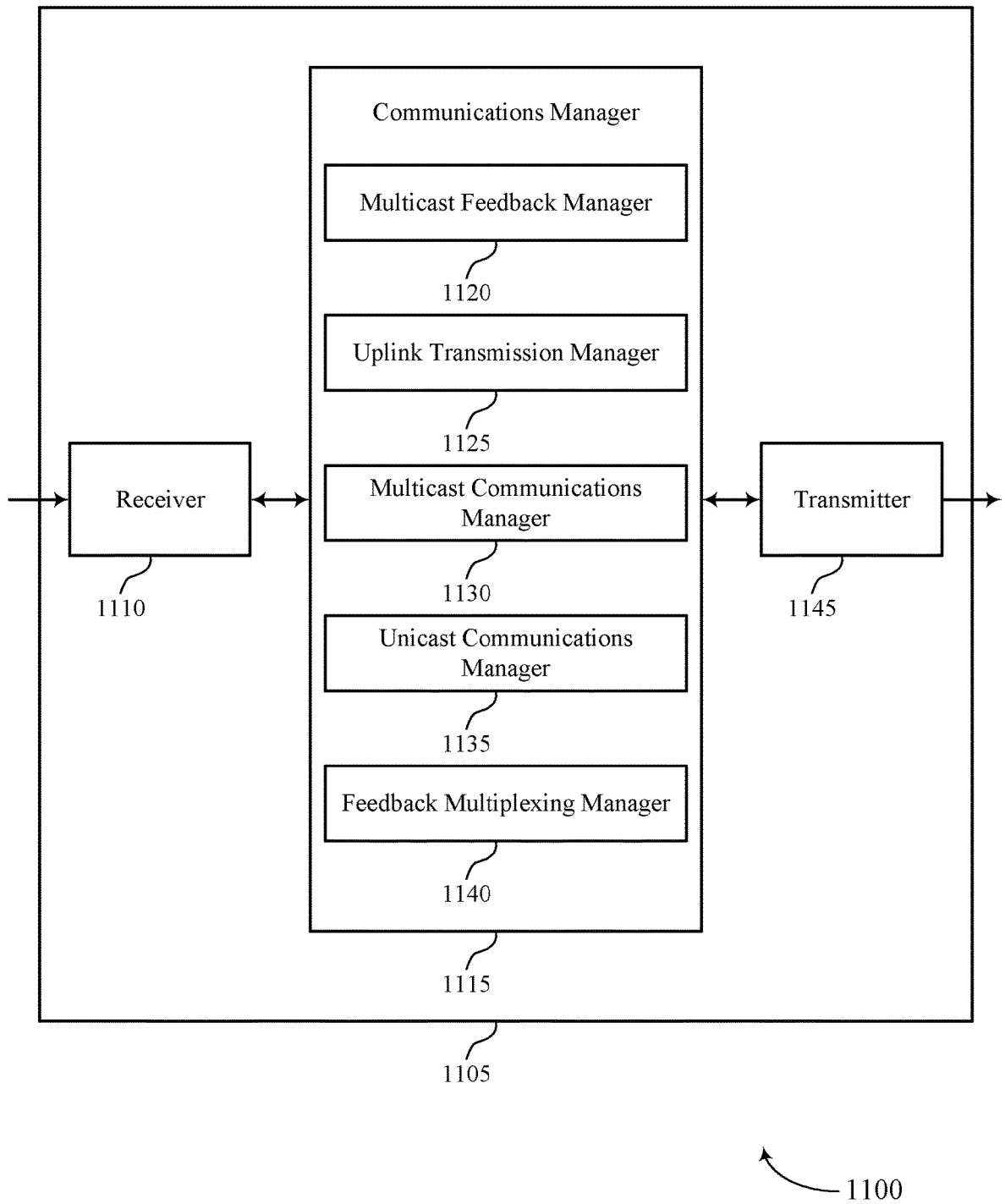

FIG. 11 shows a block diagram 1100 of a device 1105 that supports multiplexing multicast and unicast feedback in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to multiplexing multicast and unicast feedback, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a multicast feedback manager 1120, an uplink transmission manager 1125, a multicast communications manager 1130, an unicast communications manager 1135, and a feedback multiplexing manager 1140. The communications manager 1115 may be an example of aspects of the communications manager 1310 described herein.

The multicast feedback manager 1120 may configure a first UE with a set of subsets of multicast feedback resources to use for providing a multicast feedback indication associated with one or more multicast communications, where each subset of the set of subsets of multicast feedback resources is associated with a different corresponding channel metric.

The uplink transmission manager 1125 may allocate, to the first UE, uplink resources in at least a first uplink transmission occasion for communication of feedback information from the first UE.

The multicast communications manager 1130 may transmit a multicast communication to a set of UEs including the first UE.

The unicast communications manager 1135 may transmit a unicast communication to the first UE, where both the multicast feedback indication and a unicast feedback indication are to be provided in the first uplink transmission occasion.

The feedback multiplexing manager 1140 may receive, from the first UE in the first uplink transmission occasion, a multiplexed feedback message that multiplexes the unicast feedback indication, the multicast feedback indication, and an indication of a first subset of multicast feedback resources associated with a first channel metric at the first UE.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
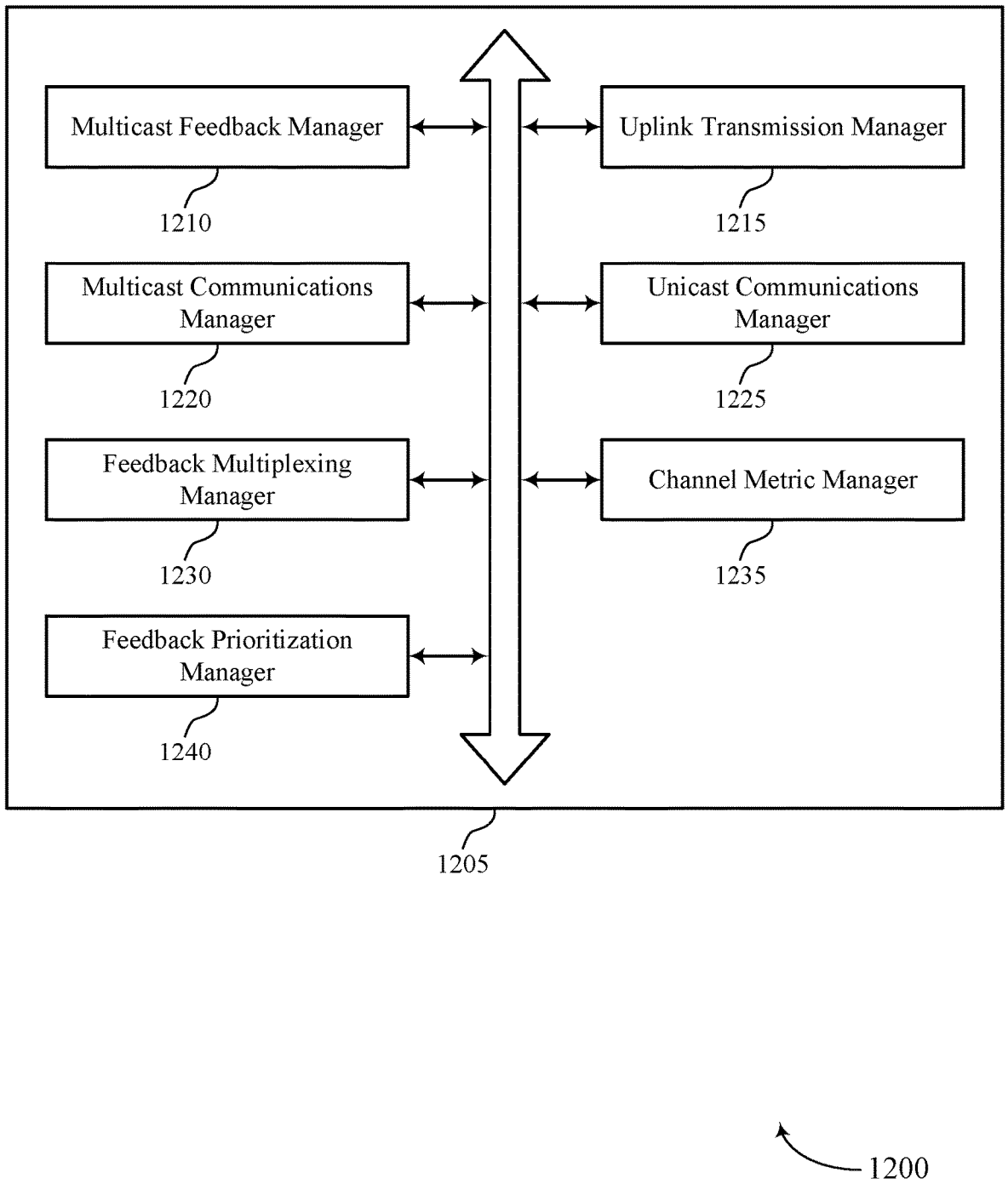
FIG. 12 shows a block diagram of a communications manager that supports multiplexing multicast and unicast feedback in accordance with aspects of the present disclosure.

FIG. 12 shows a block diagram 1200 of a communications manager 1205 that supports multiplexing multicast and unicast feedback in accordance with aspects of the present disclosure. The communications manager 1205 may be an example of aspects of a communications manager 1015, a communications manager 1115, or a communications manager 1310 described herein. The communications manager 1205 may include a multicast feedback manager 1210, an uplink transmission manager 1215, a multicast communications manager 1220, an unicast communications manager 1225, a feedback multiplexing manager 1230, a channel metric manager 1235, and a feedback prioritization manager 1240. Each of these modules may communicate, directly or indirectly, with one another (e.g., via one or more buses).

The multicast feedback manager 1210 may configure a first UE with a set of subsets of multicast feedback resources to use for providing a multicast feedback indication associated with one or more multicast communications, where each subset of the set of subsets of multicast feedback resources is associated with a different corresponding channel metric. In some cases, the indication of the first subset of multicast feedback resources is provided based on an uplink control channel resource identification used to transmit the multiplexed feedback message. In some cases, a set of uplink control channel resource identifications have a joint initialization of associated parameters that are mapped to different unicast or multicast feedback parameters. In some cases, the joint initialization includes a different cyclic shift that is applied based on a feedback value of the multicast feedback, the unicast feedback, or combinations thereof.

The uplink transmission manager 1215 may allocate, to the first UE, uplink resources in at least a first uplink transmission occasion for communication of feedback information from the first UE. In some examples, the uplink transmission manager 1215 may transmit DCI that provides a downlink grant for at least one of the one or more of the unicast communications and an indication of uplink resources for the first uplink transmission occasion, where the DCI indicates that the multiplexed feedback message is to be transmitted in the first uplink transmission occasion.

In some examples, the uplink transmission manager 1215 may transmit DCI that provides a downlink grant for at least one of the one or more of the unicast communications and an indication that the multicast feedback indication is to be piggybacked with shared channel data in an uplink shared channel communication. In some cases, the uplink transmission occasion is an uplink control channel occasion or an uplink shared channel occasion in which control information is piggybacked with shared channel data. In some cases, the UE transmits the multiplexed feedback message responsive to the DCI irrespective of whether the UE received multicast scheduling information associated with the one or more multicast communications. In some cases, the piggybacked multicast feedback indication is punctured onto the shared channel data in the uplink shared channel communication. In some cases, the DCI further indicates reserved resources within the uplink shared channel communication that are to be used for the piggybacked multicast feedback indication.

The multicast communications manager 1220 may transmit a multicast communication to a set of UEs including the first UE. The unicast communications manager 1225 may transmit a unicast communication to the first UE, where both the multicast feedback indication and a unicast feedback indication are to be provided in the first uplink transmission occasion.

The feedback multiplexing manager 1230 may receive, from the first UE in the first uplink transmission occasion, a multiplexed feedback message that multiplexes the unicast feedback indication, the multicast feedback indication, and an indication of a first subset of multicast feedback resources associated with a first channel metric at the first UE. In some examples, the feedback multiplexing manager 1230 may receive, in the first uplink transmission occasion, two or more concurrent multiplexed feedback messages for each of two or more multicast communications, each of the two or more concurrent multiplexed feedback messages providing an associated multicast feedback indication and an associated subset of multicast feedback resources.

In some examples, the feedback multiplexing manager 1230 may multiple multiplexed feedback message communications are transmitted corresponding to multiple multicast communications, and where different portions of channel metric information associated with the multicast communications are transmitted in different multiplexed feedback messages, and where the channel metric information associated with the multicast communications are assumed to be identical across the multiple multiplexed feedback message communications. In some examples, the feedback multiplexing manager 1230 may separate concurrent transmissions that indicate the multicast feedback indication and the unicast feedback indication are transmitted by the first UE.

In some cases, the multicast feedback indication includes a subset identification corresponding to the first subset of multicast feedback resources. In some cases, the multiplexed feedback message includes a first subset of bits associated with the unicast feedback indication and a second subset of bits associated with the multicast feedback indication and the subset identification. In some cases, the second subset of bits indicate a number of states associated with a number of the set of subsets of multicast feedback resources and a state that indicates whether at least one of the one or more multicast communications was successfully received. In some cases, the multiplexed feedback message further includes a third subset of bits that indicates a beam used at the UE for receiving the one or more multicast communications.

In some cases, the multicast feedback indication provides feedback for multiple multicast transport blocks (TBs) of the one or more multicast communications. and where the channel metric associated with the first subset of multicast feedback resources applies to each of the multiple multicast TBs. In some cases, the multicast feedback indication includes a first bitstream that indicates the first subset of multicast feedback resources and a second bitstream that indicates an acknowledgment or negative acknowledgment for each of the one or more multicast communications.

In some cases, the multiplexed feedback message includes a first subset of bits associated with the unicast feedback indication and a second subset of bits associated with the multicast feedback indication, and where the second subset of bits indicates whether the one or more multicast communications were successfully received and includes one or more additional bits that indicate a subset identification associated with the first subset of the set of subsets of multicast feedback resources. In some cases, the one or more additional bits are reserved or reused when acknowledgment feedback is provided for each of the one or more multicast communications. In some cases, the one or more additional bits are reused to provide unicast uplink control information. In some cases, the multiplexed feedback message includes a bitmap that indicates which subset of the set of subsets of multicast feedback resources selected at the first subset at the UE.

In some cases, the multiplexed feedback message includes a payload that is determined based on resources of the first uplink transmission occasion. In some cases, the multiplexed feedback message includes only acknowledgment or negative-acknowledgment feedback in the multicast feedback indication, and only acknowledgment or negative-acknowledgment feedback in the unicast feedback indication, when an available payload size is less than a first threshold value. In some cases, the multiplexed feedback message includes acknowledgment or negative-acknowledgment feedback in the multicast feedback indication, and the unicast feedback indication and a unicast channel metric in the unicast feedback indication, when the available payload size is between the first threshold value and a second threshold value. In some cases, the multiplexed feedback message includes acknowledgment or negative-acknowledgment feedback and the indication of the first subset of multicast feedback resources in the multicast feedback indication, and acknowledgment or negative-acknowledgment feedback and the unicast channel metric in the unicast feedback indication, when the available payload size is at or above the second threshold value.

In some cases, the number of bits in the multicast feedback indication is further based on a number of multicast transport blocks that have feedback to be reported. In some cases, the multiplexed feedback message indicates an acknowledgment of receipt of the one or more multicast communications and the indication of the first subset of multicast feedback resources to provide an indication of channel metrics associated with the one or more multicast communications. In some cases, the multiplexed feedback message includes one or more bits that indicate the channel metric for the multicast feedback indication in a subset of multiple multiplexed feedback message communications, and where one or more other multiplexed feedback message communications indicate only an acknowledgment or negative-acknowledgment of the corresponding multicast communication. In some cases, the subset of multiple multiplexed feedback message communications is provided by a higher layer parameter.

In some cases, the separate concurrent transmissions are transmitted via separate beams, via different resource blocks, or any combinations thereof. In some cases, the separate concurrent transmissions are enabled based on a capability of the UE. In some cases, the UE determines to drop one or more multicast feedback indications from the multiplexed feedback message based on a timeline between the multicast communication and the first uplink control channel occasion.

In some cases, the multiplexed feedback message includes a first subset of bits associated with acknowledgment or negative-acknowledgment indications for the one or more multicast communications, and a second subset of bits associated with the channel metric of the UE, and where the first subset of bits is mapped to be closer to a reference signal of the first uplink transmission occasion than the second subset of bits.

The channel metric manager 1235 may channel metric information associated with the one or more multicast communications is inferred from channel metric information associated with the one or more unicast communications when the multicast feedback indication does not provide channel metric information. In some cases, the multiplexed feedback message includes an explicit value of the channel metric associated with the one or more multicast communications, or the indication of the first subset of multicast feedback resources. In some cases, the explicit value of the channel metric associated with the multicast communication or the indication of the first subset of multicast feedback resources is indicated based on an available payload size for the multiplexed feedback message in the first uplink transmission occasion.

The feedback prioritization manager 1240 may determine positive or negative acknowledgement feedback indications of the multicast communication(s) have priority over multicast channel metric feedback and unicast channel metric feedback. In some cases, one or more portions of unicast feedback, multicast feedback, or combinations thereof, that are to be included with the multiplexed feedback message is determined based on one or more prioritization or dropping rules. In some cases, a first component of multicast channel metric feedback has priority over one or more other components of multicast channel metric feedback. In some cases, a first component of channel state information feedback associated with the unicast feedback indication have priority over all or a portion of multicast feedback indications.

Figure 13:
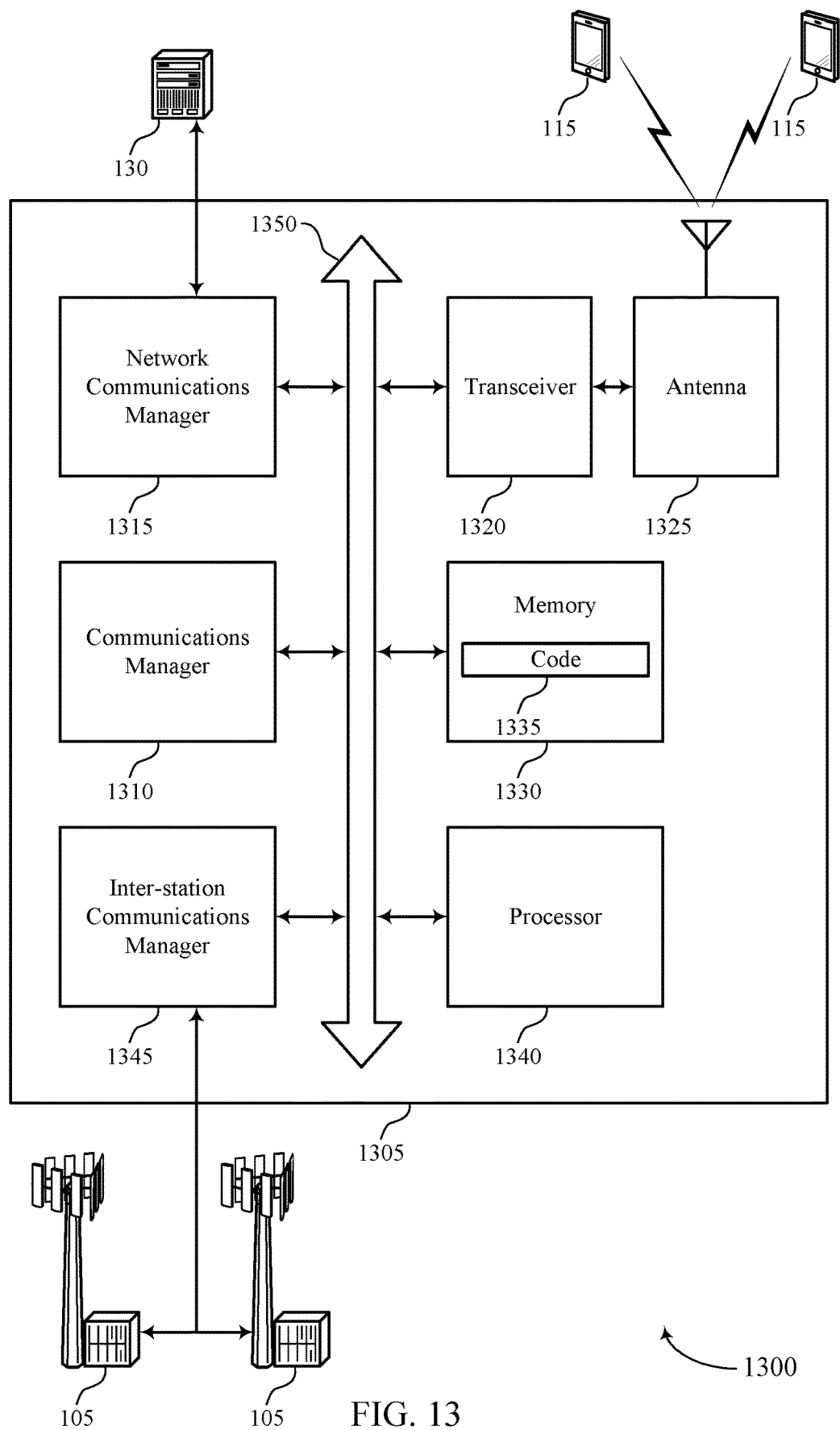
FIG. 13 shows a diagram of a system including a device that supports multiplexing multicast and unicast feedback in accordance with aspects of the present disclosure.

FIG. 13 shows a diagram of a system 1300 including a device 1305 that supports multiplexing multicast and unicast feedback in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may configure a first UE with a set of subsets of multicast feedback resources to use for providing a multicast feedback indication associated with one or more multicast communications, where each subset of the set of subsets of multicast feedback resources is associated with a different corresponding channel metric, allocate, to the first UE, uplink resources in at least a first uplink transmission occasion for communication of feedback information from the first UE, transmit a multicast communication to a set of UEs including the first UE, transmit a unicast communication to the first UE, where both the multicast feedback indication and a unicast feedback indication are to be provided in the first uplink transmission occasion, and receive, from the first UE in the first uplink transmission occasion, a multiplexed feedback message that multiplexes the unicast feedback indication, the multicast feedback indication, and an indication of a first subset of multicast feedback resources associated with a first channel metric at the first UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting multiplexing multicast and unicast feedback).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
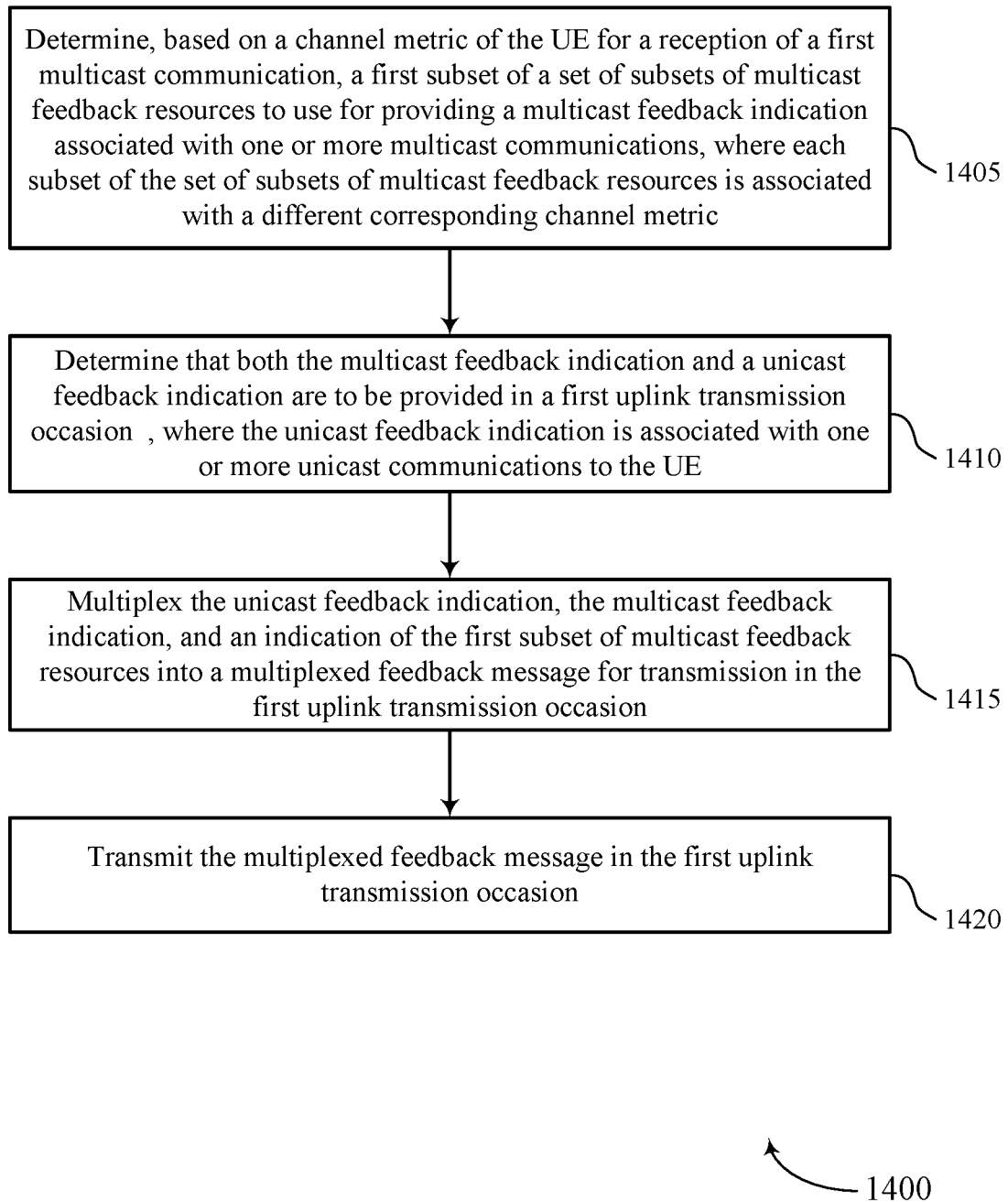
FIGS. 14 through 17 show flowcharts illustrating methods that support multiplexing multicast and unicast feedback in accordance with aspects of the present disclosure.

FIG. 14 shows a flowchart illustrating a method 1400 that supports multiplexing multicast and unicast feedback in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric. The operations of 1405 may be performed according to the methods described herein. In some examples, aspects of the operations of 1405 may be performed by a multicast feedback manager as described with reference to FIGS. 6 through 9.

At 1410, the UE may determine that both the multicast feedback indication and a unicast feedback indication are to be provided in a first uplink transmission occasion, where the unicast feedback indication is associated with one or more unicast communications to the UE. The operations of 1410 may be performed according to the methods described herein. In some examples, aspects of the operations of 1410 may be performed by a HARQ manager as described with reference to FIGS. 6 through 9.

At 1415, the UE may multiplex the unicast feedback indication, the multicast feedback indication, and an indication of the first subset of multicast feedback resources into a multiplexed feedback message for transmission in the first uplink transmission occasion. The operations of 1415 may be performed according to the methods described herein. In some examples, aspects of the operations of 1415 may be performed by a feedback multiplexing manager as described with reference to FIGS. 6 through 9.

At 1420, the UE may transmit the multiplexed feedback message in the first uplink transmission occasion. The operations of 1420 may be performed according to the methods described herein. In some examples, aspects of the operations of 1420 may be performed by an uplink transmission manager as described with reference to FIGS. 6 through 9. In some cases, the multicast feedback indication includes a subset identification corresponding to the first subset of multicast feedback resources. In some cases, the multiplexed feedback message includes a first subset of bits associated with the unicast feedback indication and a second subset of bits associated with the multicast feedback indication and the subset identification. In some cases, the second subset of bits indicate a number of states associated with a number of the set of subsets of multicast feedback resources and a state that indicates whether at least one of the one or more multicast communications was successfully received.

Figure 15:
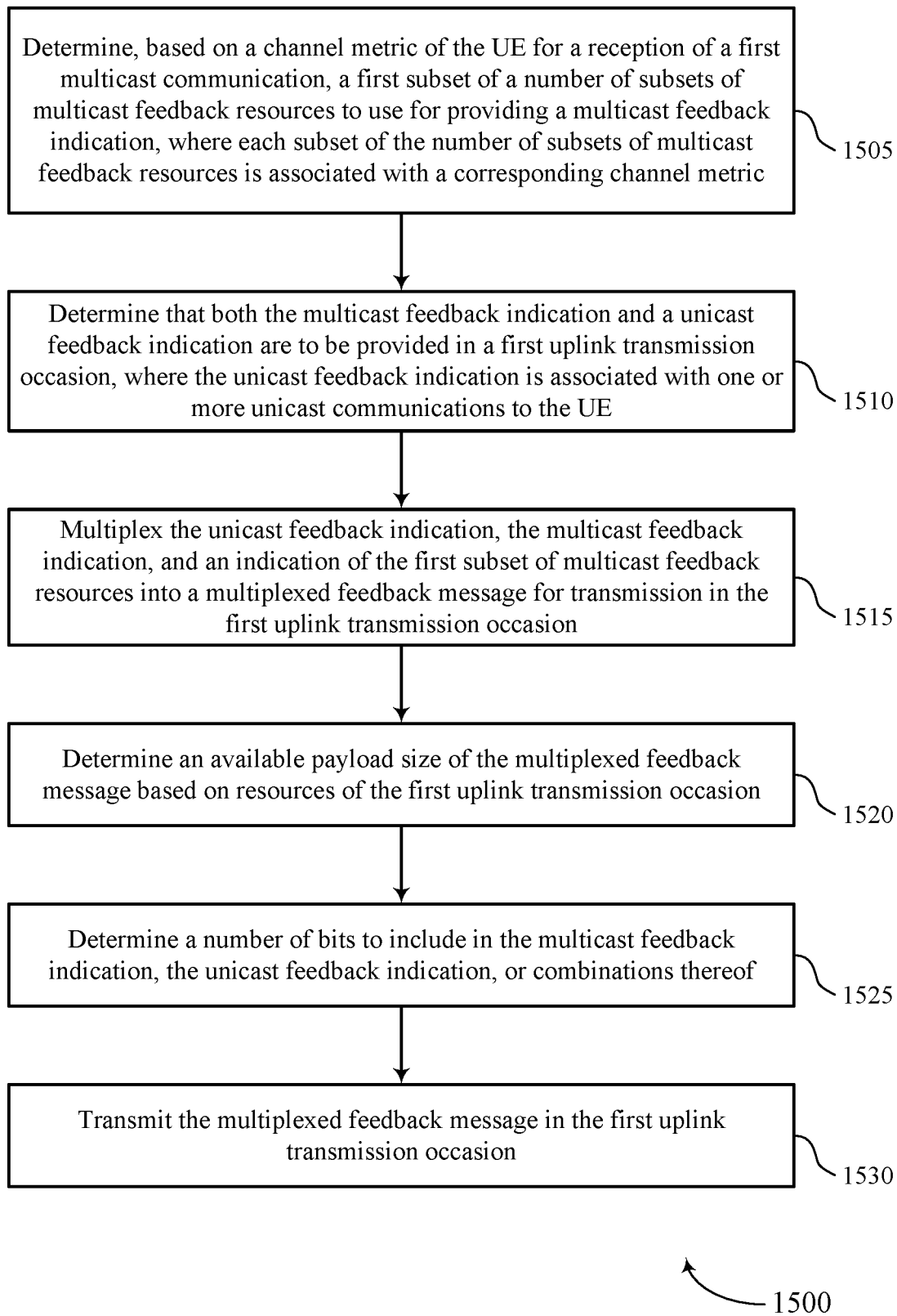

FIG. 15 shows a flowchart illustrating a method 1500 that supports multiplexing multicast and unicast feedback in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine, based on a channel metric of the UE for a reception of a first multicast communication, a first subset of a number of subsets of multicast feedback resources to use for providing a multicast feedback indication, where each subset of the number of subsets of multicast feedback resources is associated with a different corresponding channel metric. The operations of 1505 may be performed according to the methods described herein. In some examples, aspects of the operations of 1505 may be performed by a multicast feedback manager as described with reference to FIGS. 6 through 9.

At 1510, the UE may determine that both the multicast feedback indication and a unicast feedback indication are to be provided in a first uplink control channel occasion, where the unicast feedback indication is associated with one or more unicast communications to the UE. The operations of 1510 may be performed according to the methods described herein. In some examples, aspects of the operations of 1510 may be performed by a HARQ manager as described with reference to FIGS. 6 through 9.

At 1515, the UE may multiplex the unicast feedback indication, the multicast feedback indication, and an indication of the first subset of multicast feedback resources into a multiplexed feedback message for transmission in the first uplink transmission occasion. The operations of 1515 may be performed according to the methods described herein. In some examples, aspects of the operations of 1515 may be performed by a feedback multiplexing manager as described with reference to FIGS. 6 through 9.

At 1520, the UE may determine an available payload size of the multiplexed feedback message based on resources of the first uplink transmission occasion. The operations of 1520 may be performed according to the methods described herein. In some examples, aspects of the operations of 1520 may be performed by a feedback multiplexing manager as described with reference to FIGS. 6 through 9.

At 1525, the UE may determine a number of bits to include in the multicast feedback indication, the unicast feedback indication, or combinations thereof. The operations of 1525 may be performed according to the methods described herein. In some examples, aspects of the operations of 1525 may be performed by a feedback multiplexing manager as described with reference to FIGS. 6 through 9.

At 1530, the UE may transmit the multiplexed feedback message in the first uplink transmission occasion. The operations of 1530 may be performed according to the methods described herein. In some examples, aspects of the operations of 1530 may be performed by an uplink transmission manager as described with reference to FIGS. 6 through 9.

Figure 16:
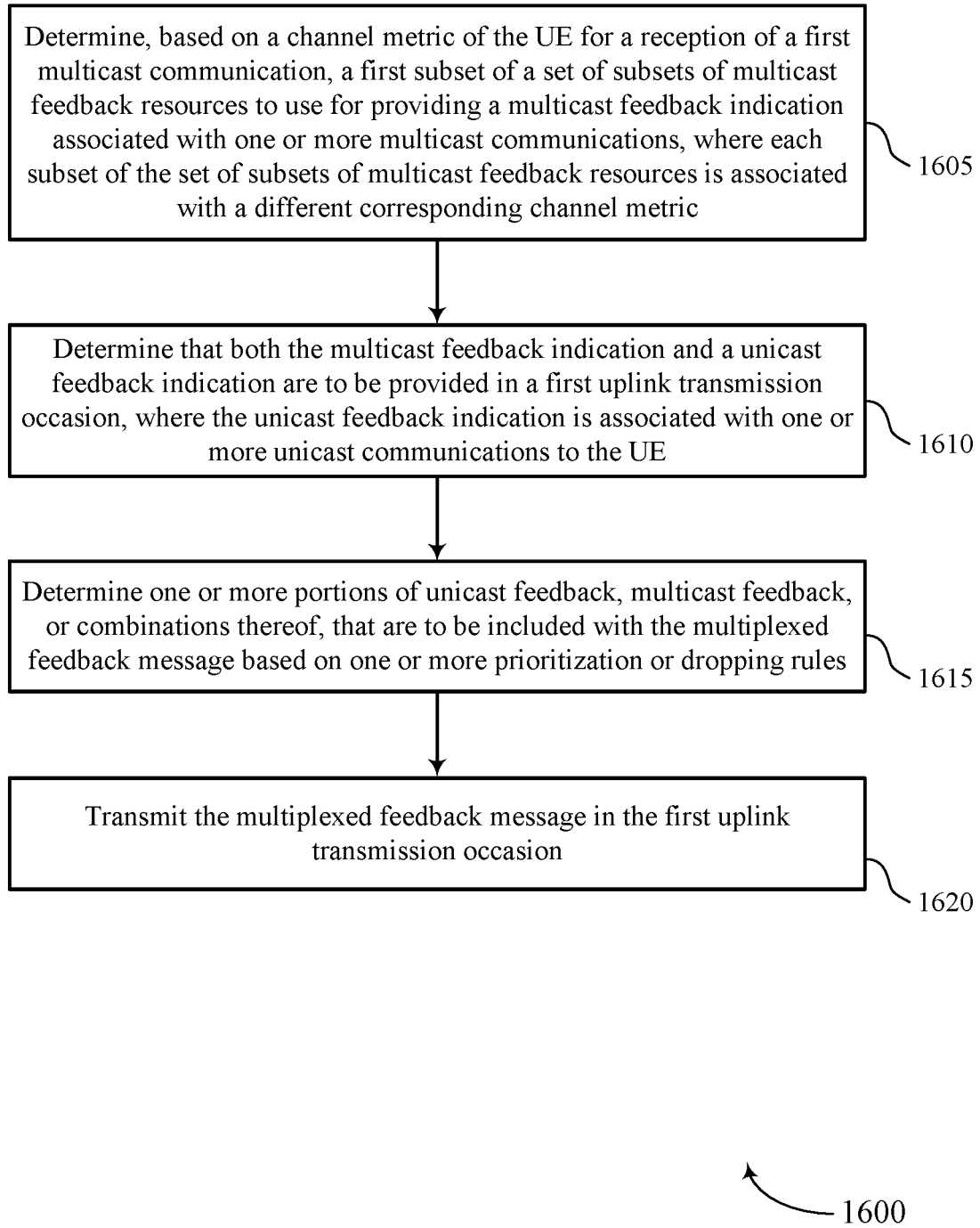

FIG. 16 shows a flowchart illustrating a method 1600 that supports multiplexing multicast and unicast feedback in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine, based on a channel metric of the UE for a reception of a first multicast communication, a first subset of a set of subsets of multicast feedback resources to use for providing a multicast feedback indication associated with one or more multicast communications, where each subset of the set of subsets of multicast feedback resources is associated with a different corresponding channel metric. The operations of 1605 may be performed according to the methods described herein. In some examples, aspects of the operations of 1605 may be performed by a multicast feedback manager as described with reference to FIGS. 6 through 9.

At 1610, the UE may determine that both the multicast feedback indication and a unicast feedback indication are to be provided in a first uplink transmission occasion, where the unicast feedback indication is associated with one or more unicast communications to the UE. The operations of 1610 may be performed according to the methods described herein. In some examples, aspects of the operations of 1610 may be performed by a HARQ manager as described with reference to FIGS. 6 through 9.

At 1615, the UE may determine one or more portions of unicast feedback, multicast feedback, or combinations thereof, that are to be included with the multiplexed feedback message based on one or more prioritization or dropping rules. The operations of 1615 may be performed according to the methods described herein. In some examples, aspects of the operations of 1615 may be performed by a feedback prioritization manager as described with reference to FIGS. 6 through 9. In some cases, positive or negative acknowledgement feedback indications of the multicast communication(s) have priority over multicast channel metric feedback and unicast channel metric feedback, a first component of multicast channel metric feedback has priority over one or more other components of multicast channel metric feedback, a first component of channel state information feedback associated with the unicast feedback indication has priority over all or a portion of multicast feedback indications, or any combinations thereof.

At 1620, the UE may transmit the multiplexed feedback message in the first uplink transmission occasion. The operations of 1620 may be performed according to the methods described herein. In some examples, aspects of the operations of 1620 may be performed by an uplink transmission manager as described with reference to FIGS. 6 through 9.

Figure 17:
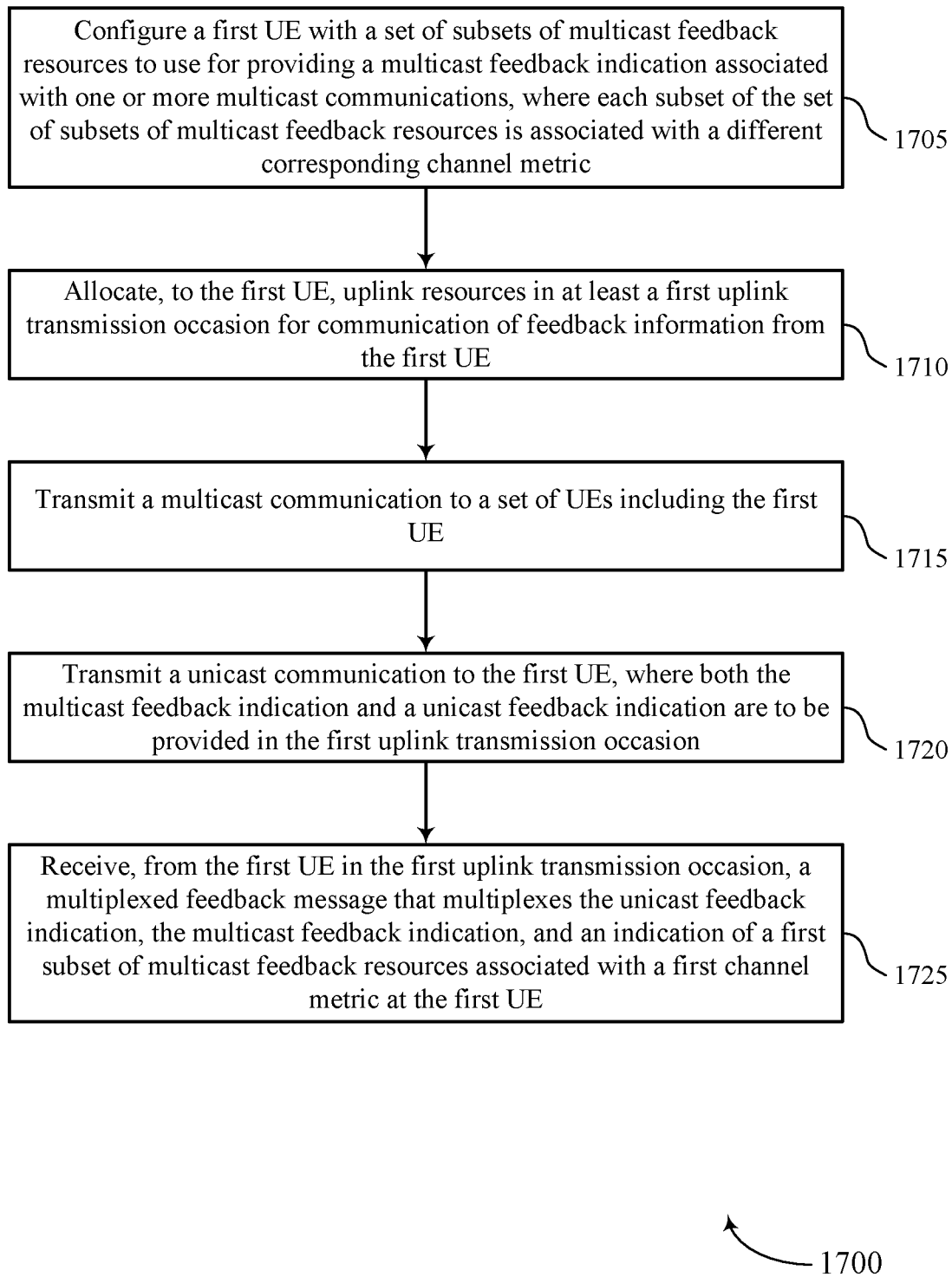

FIG. 17 shows a flowchart illustrating a method 1700 that supports multiplexing multicast and unicast feedback in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may configure a first UE with a set of subsets of multicast feedback resources to use for providing a multicast feedback indication associated with one or more multicast communications, where each subset of the set of subsets of multicast feedback resources is associated with a different corresponding channel metric. The operations of 1705 may be performed according to the methods described herein. In some examples, aspects of the operations of 1705 may be performed by a multicast feedback manager as described with reference to FIGS. 10 through 13.

At 1710, the base station may allocate, to the first UE, uplink resources in at least a first uplink transmission occasion for communication of feedback information from the first UE. The operations of 1710 may be performed according to the methods described herein. In some examples, aspects of the operations of 1710 may be performed by an uplink transmission manager as described with reference to FIGS. 10 through 13.

At 1715, the base station may transmit a multicast communication to a set of UEs including the first UE. The operations of 1715 may be performed according to the methods described herein. In some examples, aspects of the operations of 1715 may be performed by a multicast communications manager as described with reference to FIGS. 10 through 13.

At 1720, the base station may transmit a unicast communication to the first UE, where both the multicast feedback indication and a unicast feedback indication are to be provided in the first uplink transmission occasion. The operations of 1720 may be performed according to the methods described herein. In some examples, aspects of the operations of 1720 may be performed by an unicast communications manager as described with reference to FIGS. 10 through 13.

At 1725, the base station may receive, from the first UE in the first uplink transmission occasion, a multiplexed feedback message that multiplexes the unicast feedback indication, the multicast feedback indication, and an indication of a first subset of multicast feedback resources associated with a first channel metric at the first UE. The operations of 1725 may be performed according to the methods described herein. In some examples, aspects of the operations of 1725 may be performed by a feedback multiplexing manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining, based at least in part on a channel metric of the UE for a reception of at least a first multicast communication, a first subset of a plurality of subsets of multicast feedback resources to use for providing a multicast feedback indication associated with one or more multicast communications, wherein each subset of the plurality of subsets of multicast feedback resources is associated with a different corresponding channel metric; determining that both the multicast feedback indication and a unicast feedback indication are to be provided in a first uplink transmission occasion, wherein the unicast feedback indication is associated with one or more unicast communications to the UE; multiplexing the unicast feedback indication, the multicast feedback indication, and an indication of the first subset of multicast feedback resources into a multiplexed feedback message for transmission in the first uplink transmission occasion; and transmitting the multiplexed feedback message in the first uplink transmission occasion.

Aspect 2: The method of aspect 1, wherein the multicast feedback indication includes a subset identification corresponding to the first subset of multicast feedback resources.

Aspect 3: The method of aspect 2, wherein the multiplexed feedback message includes a first subset of bits associated with the unicast feedback indication and a second subset of bits associated with the multicast feedback indication and the subset identification.

Aspect 4: The method of aspect 3, wherein the second subset of bits indicate a number of states associated with a number of the plurality of subsets of multicast feedback resources and a state that indicates whether at least one of the one or more multicast communications was successfully received.

Aspect 5: The method of any of aspects 2 through 4, wherein the multiplexed feedback message further includes a third subset of bits that indicates a beam used at the UE for receiving the one or more multicast communications.

Aspect 6: The method of any of aspects 1 through 5, wherein the multicast feedback indication provides feedback for multiple multicast transport blocks (TBs) of the one or more multicast communications, and wherein the channel metric associated with the first subset of multicast feedback resources applies to each of the multiple multicast TBs.

Aspect 7: The method of aspect 6, wherein the multicast feedback indication includes a first bitstream that indicates the first subset of multicast feedback resources and a second bitstream that indicates an acknowledgment or negative acknowledgment for each of the one or more multicast communications.

Aspect 8: The method of any of aspects 1 through 5, wherein the multicast feedback indication provides feedback for multiple multicast transport blocks (TBs) of the one or more multicast communications, and wherein separate channel metrics associated with each of the one or more multicast communications are provided in separate bitstreams, and a further separate bitstream indicates an acknowledgment or negative acknowledgment for each of the one or more multicast communications.

Aspect 9: The method of any of aspects 1 through 5, wherein the multiplexed feedback message includes a first subset of bits associated with the unicast feedback indication and a second subset of bits associated with the multicast feedback indication, and the second subset of bits indicates whether the one or more multicast communications were successfully received and includes one or more additional bits that indicate a subset identification associated with the first subset of the plurality of subsets of multicast feedback resources.

Aspect 10: The method of aspect 9, wherein the one or more additional bits are reserved or reused when acknowledgment feedback is provided for each of the one or more multicast communications.

Aspect 11: The method of aspect 10, wherein the one or more additional bits are reused to provide unicast uplink control information.

Aspect 12: The method of aspect 1, wherein the multiplexed feedback message includes a bitmap that indicates which subset of the plurality of subsets of multicast feedback resources selected as the first subset at the UE.

Aspect 13: The method of aspect 1, further comprising: determining an available payload size of the multiplexed feedback message based on resources of the first uplink transmission occasion; and determining a number of bits to include in the multicast feedback indication, the unicast feedback indication, or combinations thereof.

Aspect 14: The method of aspect 13, wherein the determining the number of bits comprises: determining to include only acknowledgment or negative-acknowledgment feedback in the multicast feedback indication, and only acknowledgment or negative-acknowledgment feedback in the unicast feedback indication, when the available payload size is less than a first threshold value; determining to include acknowledgment or negative-acknowledgment feedback in the multicast feedback indication and the unicast feedback indication, and a unicast channel metric, when the available payload size is between the first threshold value and a second threshold value; and determining to include acknowledgment or negative-acknowledgment feedback and the indication of the first subset of multicast feedback resources in the multicast feedback indication, and to include acknowledgment or negative-acknowledgment feedback and the unicast channel metric in the unicast feedback indication, when the available payload size is at or above the second threshold value.

Aspect 15: The method of any of aspects 13 through 14, wherein the number of bits to include in the multicast feedback indication is further based at least in part on a number of multicast transport blocks that have feedback to be reported.

Aspect 16: The method of aspect 1, further comprising: determining whether to transmit an explicit value of the channel metric associated with the one or more multicast communications, or the indication of the first subset of multicast feedback resources, with the multiplexed feedback message.

Aspect 17: The method of aspect 16, wherein the determining whether to transmit the explicit value of the channel metric is based at least in part on an available payload size for the multiplexed feedback message in the first uplink transmission occasion.

Aspect 18: The method of any of aspects 1 through 17, wherein the indication of the first subset of multicast feedback resources is provided based on an uplink control channel resource identification used to transmit the multiplexed feedback message.

Aspect 19: The method of aspect 18, wherein a plurality of uplink control channel resource identifications have a joint initialization of associated parameters that are mapped to different unicast or multicast feedback parameters.

Aspect 20: The method of aspect 19, wherein the joint initialization includes a different cyclic shift that is applied based on a feedback value of the multicast feedback, the unicast feedback, or combinations thereof.

Aspect 21: The method of aspect 1, wherein the multiplexed feedback message indicates an acknowledgment of receipt of the one or more multicast communications and the indication of the first subset of multicast feedback resources to provide an indication of channel metrics associated with the one or more multicast communications.

Aspect 22: The method of aspect 1, wherein the multiplexed feedback message includes one or more bits that indicate the channel metric for the multicast feedback indication in a subset of multiple multiplexed feedback message communications, and one or more other multiplexed feedback message communications indicate only an acknowledgment or negative-acknowledgment of the corresponding multicast communication.

Aspect 23: The method of aspect 22, wherein the subset of multiple multiplexed feedback message communications is determined based at least in part of a higher layer parameter.

Aspect 24: The method of aspect 1, wherein multiple multiplexed feedback message communications are transmitted corresponding to multiple multicast communications, and wherein different portions of channel metric information associated with the multicast communications are transmitted in different multiplexed feedback messages.

Aspect 25: The method of aspect 1, further comprising: determining that the one or more multicast communications have an associated channel metric that can be inferred from channel state information associated with the one or more unicast communications; and transmitting only channel metric information associated with the one or more unicast communications in the multiplexed feedback message.

Aspect 26: The method of any of aspects 1 through 25, further comprising: determining one or more portions of unicast feedback, multicast feedback, or combinations thereof, that are to be included with the multiplexed feedback message based at least in part on one or more prioritization or dropping rules.

Aspect 27: The method of aspect 26, wherein the one or more prioritization or dropping rules include one or more of positive or negative acknowledgement feedback indications of the multicast communication(s) have priority over multicast channel metric feedback and unicast channel metric feedback; a first component of multicast channel metric feedback has priority over one or more other components of multicast channel metric feedback; a first component of channel state information feedback associated with the unicast feedback indication have priority over all or a portion of multicast feedback indications; or, any combinations thereof.

Aspect 28: The method of aspect 1, wherein the transmitting comprises: transmitting separate concurrent transmissions that indicate the multicast feedback indication and the unicast feedback indication.

Aspect 29: The method of aspect 28, wherein the separate concurrent transmissions are transmitted via separate beams, via different resource blocks, or any combinations thereof.

Aspect 30: The method of any of aspects 28 through 29, wherein the separate concurrent transmissions are enabled based on a capability of the UE.

Aspect 31: The method of any of aspects 1 through 30, further comprising: determining to drop one or more multicast feedback indications from the multiplexed feedback message based on a timeline between the multicast communication and the first uplink control channel occasion.

Aspect 32: The method of any of aspects 1 through 31, wherein the uplink transmission occasion is an uplink control channel occasion or an uplink shared channel occasion in which control information is piggybacked with shared channel data.

Aspect 33: The method of aspect 1, wherein the multiplexed feedback message includes a first subset of bits associated with acknowledgment or negative-acknowledgment indications for the one or more multicast communications, and a second subset of bits associated with the channel metric of the UE, and wherein the first subset of bits is mapped to be closer to a reference signal of the first uplink transmission occasion than the second subset of bits.

Aspect 34: The method of any of aspects 1 through 33, further comprising: receiving DCI that provides an indication of uplink resources for the first uplink transmission occasion, wherein the DCI indicates that the multiplexed feedback message is to be transmitted in the first uplink transmission occasion.

Aspect 35: The method of aspect 34, wherein the UE transmits the multiplexed feedback message responsive to the DCI irrespective of whether the UE received multicast scheduling information associated with the one or more multicast communications.

Aspect 36: The method of any of aspects 1 through 35, further comprising: receiving DCI that provides an indication that the multiplexed feedback message is to be piggybacked with shared channel data in an uplink shared channel communication.

Aspect 37: The method of aspect 36, wherein at least a subset of bits of the piggybacked multicast feedback indication are punctured onto the shared channel data in the uplink shared channel communication.

Aspect 38: The method of any of aspects 36 through 37, wherein the DCI further indicates reserved resources within the uplink shared channel communication that are to be used for the piggybacked multicast feedback indication.

Aspect 39: A method for wireless communication at a base station, comprising: configuring a first UE with a plurality of subsets of multicast feedback resources to use for providing a multicast feedback indication associated with one or more multicast communications, wherein each subset of the plurality of subsets of multicast feedback resources is associated with a different corresponding channel metric; allocating, to the first UE, uplink resources in at least a first uplink transmission occasion for communication of feedback information from the first UE; transmitting a multicast communication to a plurality of UEs including the first UE; transmitting a unicast communication to the first UE, wherein both the multicast feedback indication and a unicast feedback indication are to be provided in the first uplink transmission occasion; and receiving, from the first UE in the first uplink transmission occasion, a multiplexed feedback message that multiplexes the unicast feedback indication, the multicast feedback indication, and an indication of a first subset of multicast feedback resources associated with a first channel metric at the first UE.

Aspect 40: The method of aspect 39, wherein the multicast feedback indication includes a subset identification corresponding to the first subset of multicast feedback resources.

Aspect 41: The method of aspect 40, wherein the multiplexed feedback message includes a first subset of bits associated with the unicast feedback indication and a second subset of bits associated with the multicast feedback indication and the subset identification.

Aspect 42: The method of aspect 41, wherein the second subset of bits indicate a number of states associated with a number of the plurality of subsets of multicast feedback resources and a state that indicates whether at least one of the one or more multicast communications was successfully received.

Aspect 43: The method of any of aspects 40 through 42, wherein the multiplexed feedback message further includes a third subset of bits that indicates a beam used at the UE for receiving the one or more multicast communications.

Aspect 44: The method of any of aspects 39 through 43, wherein the multicast feedback indication provides feedback for multiple multicast transport blocks (TBs) of the one or more multicast communications. and wherein the channel metric associated with the first subset of multicast feedback resources applies to each of the multiple multicast TBs.

Aspect 45: The method of aspect 44, wherein the multicast feedback indication includes a first bitstream that indicates the first subset of multicast feedback resources and a second bitstream that indicates an acknowledgment or negative acknowledgment for each of the one or more multicast communications.

Aspect 46: The method of any of aspects 39 through 43, wherein the multicast feedback indication provides feedback for multiple multicast transport blocks (TBs) of the one or more multicast communications, and wherein separate channel metrics associated with each of the one or more multicast communications are provided in separate bitstreams, and a further separate bitstream indicates an acknowledgment or negative acknowledgment for each of the one or more multicast communications.

Aspect 47: The method of aspect 39, wherein the multiplexed feedback message includes a first subset of bits associated with the unicast feedback indication and a second subset of bits associated with the multicast feedback indication, and the second subset of bits indicates whether the one or more multicast communications were successfully received and includes one or more additional bits that indicate a subset identification associated with the first subset of the plurality of subsets of multicast feedback resources.

Aspect 48: The method of aspect 47, wherein the one or more additional bits are reserved or reused when acknowledgment feedback is provided for each of the one or more multicast communications.

Aspect 49: The method of aspect 48, wherein the one or more additional bits are reused to provide unicast uplink control information.

Aspect 50: The method of aspect 39, wherein the multiplexed feedback message includes a bitmap that indicates which subset of the plurality of subsets of multicast feedback resources selected as the first subset at the UE.

Aspect 51: The method of aspect 39, wherein the multiplexed feedback message includes a payload that is determined based on resources of the first uplink transmission occasion.

Aspect 52: The method of aspect 51, wherein the multiplexed feedback message includes only acknowledgment or negative-acknowledgment feedback in the multicast feedback indication, and only acknowledgment or negative-acknowledgment feedback in the unicast feedback indication, when an available payload size is less than a first threshold value; the multiplexed feedback message includes acknowledgment or negative-acknowledgment feedback in the multicast feedback indication, and the unicast feedback indication and a unicast channel metric in the unicast feedback indication, when the available payload size is between the first threshold value and a second threshold value; and the multiplexed feedback message includes acknowledgment or negative-acknowledgment feedback and the indication of the first subset of multicast feedback resources in the multicast feedback indication, and acknowledgment or negative-acknowledgment feedback and the unicast channel metric in the unicast feedback indication, when the available payload size is at or above the second threshold value.

Aspect 53: The method of any of aspects 51 through 52, wherein the number of bits in the multicast feedback indication is further based at least in part on a number of multicast transport blocks that have feedback to be reported.

Aspect 54: The method of aspect 39, wherein the multiplexed feedback message includes an explicit value of the channel metric associated with the one or more multicast communications, or the indication of the first subset of multicast feedback resources.

Aspect 55: The method of aspect 54, wherein the explicit value of the channel metric associated with the multicast communication or the indication of the first subset of multicast feedback resources is indicated based at least in part on an available payload size for the multiplexed feedback message in the first uplink transmission occasion.

Aspect 56: The method of any of aspects 39 through 55, wherein the indication of the first subset of multicast feedback resources is provided based on an uplink control channel resource identification used to transmit the multiplexed feedback message.

Aspect 57: The method of aspect 56, wherein a plurality of uplink control channel resource identifications have a joint initialization of associated parameters that are mapped to different unicast or multicast feedback parameters.

Aspect 58: The method of aspect 57, wherein the joint initialization includes a different cyclic shift that is applied based on a feedback value of the multicast feedback, the unicast feedback, or combinations thereof.

Aspect 59: The method of aspect 39, wherein the multiplexed feedback message indicates an acknowledgment of receipt of the one or more multicast communications and the indication of the first subset of multicast feedback resources to provide an indication of channel metrics associated with the one or more multicast communications.

Aspect 60: The method of aspect 39, wherein the multiplexed feedback message includes one or more bits that indicate the channel metric for the multicast feedback indication in a subset of multiple multiplexed feedback message communications, and one or more other multiplexed feedback message communications indicate only an acknowledgment or negative-acknowledgment of the corresponding multicast communication.

Aspect 61: The method of aspect 60, wherein the subset of multiple multiplexed feedback message communications is provided by a higher layer parameter.

Aspect 62: The method of aspect 39, wherein multiple multiplexed feedback message communications are transmitted corresponding to multiple multicast communications, and wherein different portions of channel metric information associated with the multicast communications are transmitted in different multiplexed feedback messages, and wherein the channel metric information associated with the multicast communications are assumed to be identical across the multiple multiplexed feedback message communications.

Aspect 63: The method of aspect 39, wherein channel metric information associated with the one or more multicast communications is inferred from channel metric information associated with the one or more unicast communications when the multicast feedback indication does not provide channel metric information.

Aspect 64: The method of any of aspects 39 through 63, wherein one or more portions of unicast feedback, multicast feedback, or combinations thereof, that are to be included with the multiplexed feedback message is determined based at least in part on one or more prioritization or dropping rules.

Aspect 65: The method of aspect 64, wherein the one or more prioritization or dropping rules include one or more of positive or negative acknowledgement feedback indications of the multicast communication(s) have priority over multicast channel metric feedback and unicast channel metric feedback; a first component of multicast channel metric feedback has priority over one or more other components of multicast channel metric feedback; a first component of channel state information feedback associated with the unicast feedback indication have priority over all or a portion of multicast feedback indications; or, any combinations thereof Aspect 66: The method of aspect 39, wherein separate concurrent transmissions that indicate the multicast feedback indication and the unicast feedback indication are transmitted by the first UE.

Aspect 67: The method of aspect 66, wherein the separate concurrent transmissions are transmitted via separate beams, via different resource blocks, or any combinations thereof.

Aspect 68: The method of any of aspects 66 through 67, wherein the separate concurrent transmissions are enabled based on a capability of the UE.

Aspect 69: The method of any of aspects 39 through 68, wherein the UE determines to drop one or more multicast feedback indications from the multiplexed feedback message based on a timeline between the multicast communication and the first uplink control channel occasion.

Aspect 70: The method of any of aspects 39 through 69, wherein the uplink transmission occasion is an uplink control channel occasion or an uplink shared channel occasion in which control information is piggybacked with shared channel data.

Aspect 71: The method of aspect 39, wherein the multiplexed feedback message includes a first subset of bits associated with acknowledgment or negative-acknowledgment indications for the one or more multicast communications, and a second subset of bits associated with the channel metric of the UE, and wherein the first subset of bits is mapped to be closer to a reference signal of the first uplink transmission occasion than the second subset of bits.

Aspect 72: The method of any of aspects 39 through 71, further comprising: transmitting DCI that provides an indication of uplink resources for the first uplink transmission occasion, wherein the DCI indicates that the multiplexed feedback message is to be transmitted in the first uplink transmission occasion.

Aspect 73: The method of aspect 72, wherein the UE transmits the multiplexed feedback message responsive to the DCI irrespective of whether the UE received multicast scheduling information associated with the one or more multicast communications.

Aspect 74: The method of any of aspects 39 through 73, further comprising: transmitting DCI that provides an indication that the multicast feedback indication is to be piggybacked with shared channel data in an uplink shared channel communication.

Aspect 75: The method of aspect 74, wherein at least a subset of bits of the piggybacked multicast feedback indication are punctured onto the shared channel data in the uplink shared channel communication.

Aspect 76: The method of any of aspects 74 through 75, wherein the DCI further indicates reserved resources within the uplink shared channel communication that are to be used for the piggybacked multicast feedback indication.

Aspect 77: An apparatus for wireless communication at a UE, comprising a processor; memory coupled with the processor; and instructions stored in the memory and executable by the processor to cause the apparatus to perform a method of any of aspects 1 through 38.

Aspect 78: An apparatus for wireless communication at a UE, comprising at least one means for performing a method of any of aspects 1 through 38.

Aspect 79: A non-transitory computer-readable medium storing code for wireless communication at a UE, the code comprising instructions executable by a processor to perform a method of any of aspects 1 through 38.

Aspect 80: An apparatus for wireless communication at a base station, comprising a processor; memory coupled with the processor; and instructions stored in the memory and executable by the processor to cause the apparatus to perform a method of any of aspects 39 through 76.

Aspect 81: An apparatus for wireless communication at a base station, comprising at least one means for performing a method of any of aspects 39 through 76.

Aspect 82: A non-transitory computer-readable medium storing code for wireless communication at a base station, the code comprising instructions executable by a processor to perform a method of any of aspects 39 through 76.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   a processor,
   memory coupled with the processor; and
   instructions stored in the memory and executable by the processor to cause the apparatus to:
   determine, based at least in part on a channel metric of the UE for a reception of at least a first multicast communication, a first subset of a plurality of subsets of multicast feedback resources to use for providing a multicast feedback indication associated with one or more multicast communications, wherein each subset of the plurality of subsets of multicast feedback resources is associated with a different corresponding channel metric;
   determine that both the multicast feedback indication and a unicast feedback indication are to be provided in a first uplink transmission occasion, wherein the unicast feedback indication is associated with one or more unicast communications to the UE;
   multiplex the unicast feedback indication, the multicast feedback indication, and an indication of the first subset of multicast feedback resources into a multiplexed feedback message for transmission in the first uplink transmission occasion; and
   transmit the multiplexed feedback message in the first uplink transmission occasion.

2. The apparatus of claim 1, wherein the multicast feedback indication includes a subset identification corresponding to the first subset of multicast feedback resources.

3. The apparatus of claim 2, wherein the multiplexed feedback message includes a first subset of bits associated with the unicast feedback indication and a second subset of bits associated with the multicast feedback indication and the subset identification.

4. The apparatus of claim 2, wherein the multiplexed feedback message further includes a third subset of bits that indicates a beam used at the UE for receiving the one or more multicast communications.

5. The apparatus of claim 1, wherein:
the multicast feedback indication provides feedback for multiple multicast transport blocks (TBs) of the one or more multicast communications, and wherein the channel metric associated with the first subset of multicast feedback resources applies to each of the multiple multicast TBs.

6. The apparatus of claim 1, wherein:
the multicast feedback indication provides feedback for multiple multicast transport blocks (TBs) of the one or more multicast communications, and wherein separate channel metrics associated with each of the one or more multicast communications are provided in separate bitstreams, and a further separate bitstream indicates an acknowledgment or negative acknowledgment for each of the one or more multicast communications.

7. The apparatus of claim 1, wherein the multiplexed feedback message includes a first subset of bits associated with the unicast feedback indication and a second subset of bits associated with the multicast feedback indication, and wherein the second subset of bits indicates whether the one or more multicast communications were successfully received and includes one or more additional bits that indicate a subset identification associated with the first subset of the plurality of subsets of multicast feedback resources.

8. The apparatus of claim 7, wherein the one or more additional bits are reserved or reused when acknowledgment feedback is provided for each of the one or more multicast communications.

9. The apparatus of claim 1, wherein the multiplexed feedback message includes a bitmap that indicates which subset of the plurality of subsets of multicast feedback resources selected at the first subset at the UE.

10. The apparatus of claim 1, wherein the instructions are further executable by the processor to cause the apparatus to:
determine an available payload size of the multiplexed feedback message based on resources of the first uplink transmission occasion; and
determine a number of bits to include in the multicast feedback indication, the unicast feedback indication, or combinations thereof.

11. The apparatus of claim 10, wherein the instructions to determine the number of bits are executable by the processor to cause the apparatus to:
determine to include only acknowledgment or negative-acknowledgment feedback in the multicast feedback indication, and only acknowledgment or negative-acknowledgment feedback in the unicast feedback indication, when the available payload size is less than a first threshold value;
determine to include acknowledgment or negative-acknowledgment feedback in the multicast feedback indication and the unicast feedback indication, and a unicast channel metric, when the available payload size is between the first threshold value and a second threshold value; and
determine to include acknowledgment or negative-acknowledgment feedback and the indication of the first subset of multicast feedback resources in the multicast feedback indication, and to include acknowledgment or negative-acknowledgment feedback and the unicast channel metric in the unicast feedback indication, when the available payload size is at or above the second threshold value.

12. The apparatus of claim 1, wherein the instructions are further executable by the processor to cause the apparatus to:
determine, based at least in part on an available payload size for the multiplexed feedback message, whether to transmit an explicit value of the channel metric associated with the one or more multicast communications, or the indication of the first subset of multicast feedback resources, with the multiplexed feedback message.

13. The apparatus of claim 1, wherein the indication of the first subset of multicast feedback resources is provided based on an uplink control channel resource identification used to transmit the multiplexed feedback message.

14. The apparatus of claim 13, wherein a plurality of uplink control channel resource identifications have a joint initialization of associated parameters that are mapped to different unicast or multicast feedback parameters, and wherein the joint initialization includes a different cyclic shift that is applied based on a feedback value of the multicast feedback, the unicast feedback, or combinations thereof.

15. The apparatus of claim 1, wherein the multiplexed feedback message indicates an acknowledgment of receipt of the one or more multicast communications and the indication of the first subset of multicast feedback resources to provide an indication of channel metrics associated with the one or more multicast communications.

16. The apparatus of claim 1, wherein the multiplexed feedback message includes one or more bits that indicate the channel metric for the multicast feedback indication in a subset of multiple multiplexed feedback message communications, and wherein one or more other multiplexed feedback message communications indicate only an acknowledgment or negative-acknowledgment of the corresponding multicast communication.

17. The apparatus of claim 1, wherein:
multiple multiplexed feedback message communications are transmitted corresponding to multiple multicast communications, and wherein different portions of channel metric information associated with the multicast communications are transmitted in different multiplexed feedback messages.

18. The apparatus of claim 1, wherein the instructions are further executable by the processor to cause the apparatus to:
determine that the one or more multicast communications have an associated channel metric that can be inferred from channel state information associated with the one or more unicast communications; and
transmit only channel metric information associated with the one or more unicast communications in the multiplexed feedback message.

19. The apparatus of claim 1, wherein the instructions are further executable by the processor to cause the apparatus to:
determine one or more portions of unicast feedback, multicast feedback, or combinations thereof, that are to be included with the multiplexed feedback message based at least in part on one or more prioritization or dropping rules wherein the one or more prioritization or dropping rules include one or more of:
positive or negative acknowledgement feedback indications of multicast communications have priority over multicast channel metric feedback and unicast channel metric feedback;

a first component of multicast channel metric feedback has priority over one or more other components of multicast channel metric feedback;
a first component of channel state information feedback associated with the unicast feedback indication have priority over all or a portion of multicast feedback indications, or
any combinations thereof.

20. The apparatus of claim 1, wherein the instructions to transmit the multiplexed feedback message are executable by the processor to cause the apparatus to:
transmit separate concurrent transmissions that indicate the multicast feedback indication and the unicast feedback indication, and wherein the separate concurrent transmissions are transmitted via separate beams, via different resource blocks, or any combinations thereof.

21. The apparatus of claim 1, wherein the instructions are further executable by the processor to cause the apparatus to:
determine to drop one or more multicast feedback indications from the multiplexed feedback message based at least in part on a timeline between the first multicast communication and the first uplink transmission occasion.

22. The apparatus of claim 1, wherein the instructions are further executable by the processor to cause the apparatus to:
receive downlink control information (DCI) that provides an indication of uplink resources for the first uplink transmission occasion, wherein the DCI indicates that the multiplexed feedback message is to be transmitted in the first uplink transmission occasion.

23. The apparatus of claim 1, wherein the instructions are further executable by the processor to cause the apparatus to:
receive downlink control information (DCI) that provides an indication that the multiplexed feedback message is to be piggybacked with shared channel data in an uplink shared channel communication.

24. An apparatus for wireless communication at a base station, comprising:
a processor,
memory coupled with the processor; and
instructions stored in the memory and executable by the processor to cause the apparatus to:
configure a first user equipment (UE) with a plurality of subsets of multicast feedback resources to use for providing a multicast feedback indication associated with one or more multicast communications, wherein each subset of the plurality of subsets of multicast feedback resources is associated with a different corresponding channel metric;
allocate, to the first UE, uplink resources in at least a first uplink transmission occasion for communication of feedback information from the first UE;
transmit a multicast communication to a plurality of UEs including the first UE;
transmit a unicast communication to the first UE, wherein both the multicast feedback indication and a unicast feedback indication are to be provided in the first uplink transmission occasion; and
receive, from the first UE in the first uplink transmission occasion, a multiplexed feedback message that multiplexes the unicast feedback indication, the multicast feedback indication, and an indication of a first subset of multicast feedback resources associated with a first channel metric at the first UE.

25. The apparatus of claim 24, wherein the multicast feedback indication includes a subset identification corresponding to the first subset of multicast feedback resources.

26. The apparatus of claim 24, wherein:
the multicast feedback indication provides feedback for multiple multicast transport blocks (TBs) of the one or more multicast communications, and wherein the channel metric associated with the first subset of multicast feedback resources applies to each of the multiple multicast TBs.

27. A method for wireless communication at a user equipment (UE), comprising:
determining, based at least in part on a channel metric of the UE for a reception of a first multicast communication, a first subset of a plurality of subsets of multicast feedback resources to use for providing a multicast feedback indication associated with one or more multicast communications, wherein each subset of the plurality of subsets of multicast feedback resources is associated with a different corresponding channel metric;
determining that both the multicast feedback indication and a unicast feedback indication are to be provided in a first uplink transmission occasion, wherein the unicast feedback indication is associated with one or more unicast communications to the UE;
multiplexing the unicast feedback indication, the multicast feedback indication, and an indication of the first subset of multicast feedback resources into a multiplexed feedback message for transmission in the first uplink transmission occasion; and
transmitting the multiplexed feedback message in the first uplink transmission occasion.

28. The method of claim 27, wherein the multicast feedback indication includes a subset identification corresponding to the first subset of multicast feedback resources, and wherein the multiplexed feedback message includes a first subset of bits associated with the unicast feedback indication and a second subset of bits associated with the multicast feedback indication and the subset identification.

29. A method for wireless communication at a base station, comprising:
configuring a first user equipment (UE) with a plurality of subsets of multicast feedback resources to use for providing a multicast feedback indication associated with one or more multicast communications, wherein each subset of the plurality of subsets of multicast feedback resources is associated with a different corresponding channel metric associated;
allocating, to the first UE, uplink resources in at least a first uplink transmission occasion for communication of feedback information from the first UE;
transmitting a multicast communication to a plurality of UEs including the first UE;
transmitting a unicast communication to the first UE, wherein both the multicast feedback indication and a unicast feedback indication are to be provided in the first uplink transmission occasion; and
receiving, from the first UE in the first uplink transmission occasion, a multiplexed feedback message that multiplexes the unicast feedback indication, the multicast feedback indication, and an indication of a first subset of multicast feedback resources associated with a first channel metric at the first UE.

30. The method of claim 29, wherein the multicast feedback indication includes a subset identification corresponding to the first subset of multicast feedback resources, and wherein the multiplexed feedback message includes a first subset of bits associated with the unicast feedback indication and a second subset of bits associated with the multicast feedback indication and the subset identification.

\* \* \* \* \*